United States Patent
Wane

(10) Patent No.: US 10,075,841 B2
(45) Date of Patent: Sep. 11, 2018

(54) APPARATUSES, METHODS AND SYSTEMS FOR IMPLEMENTING A TRUSTED SUBSCRIPTION MANAGEMENT PLATFORM

(71) Applicant: Simless, Inc., Atlanta, GA (US)

(72) Inventor: Ismaila Wane, Atlanta, GA (US)

(73) Assignee: SIMLESS, INC., Palo Alto, CA (US)

( * ) Notice: Subject to any disclaimer, the term of this patent is extended or adjusted under 35 U.S.C. 154(b) by 0 days.

(21) Appl. No.: 14/856,991

(22) Filed: Sep. 17, 2015

(65) Prior Publication Data

US 2016/0007188 A1 Jan. 7, 2016

Related U.S. Application Data

(60) Provisional application No. 62/051,311, filed on Sep. 17, 2014, provisional application No. 62/078,006, (Continued)

(51) Int. Cl.
*H04W 88/06* (2009.01)
*H04W 88/02* (2009.01)
(Continued)

(52) U.S. Cl.
CPC ........ *H04W 8/205* (2013.01); *G06F 9/45533* (2013.01); *G06F 21/64* (2013.01);
(Continued)

(58) Field of Classification Search
CPC ..... H04W 8/183; H04W 8/205; H04W 88/06; H04W 4/001; H04W 4/003; H04W 4/24; H04W 60/005; H04W 8/18; H04B 1/3816
See application file for complete search history.

(56) References Cited

U.S. PATENT DOCUMENTS

| 5,628,030 A | 5/1997 | Tuckner |
| 7,206,338 B1 | 4/2007 | Kubler et al. |

(Continued)

FOREIGN PATENT DOCUMENTS

| CN | 102 065 582 A | 5/2011 |
| EP | 0936530 A1 | 8/1999 |

(Continued)

OTHER PUBLICATIONS

Areno, M. et al., *Security Trusted Execution Environments with PUF Generated Secret Keys*, http://ieeexplore.ieee.org/xpl/articleDetails.jsp?arnumber=6296112.
(Continued)

*Primary Examiner* — Kamran Afshar
*Assistant Examiner* — Margaret G Mastrodonato
(74) *Attorney, Agent, or Firm* — David S. Easwaran; David Lewis

(57) ABSTRACT

Apparatuses, methods, and computer readable storage media are provided for implementing a trusted subscription management platform. An example server device is configured to transmit, to a trusted UI client of a mobile station, information regarding a set of virtual SIM cards associated with the mobile station, and receive, from the trusted UI client of the mobile station, a request to provision a particular virtual SIM card. The server device is further configured to initiate, by an SM-SR module and via a trusted baseband client of the mobile device, a secure proxy channel between the server device and a profile manager that hosts the particular virtual SIM card, and transmit, via the secure proxy channel and to the profile manager, an instruction regarding the particular virtual SIM card. Corresponding methods and computer readable storage media are provided.

20 Claims, 14 Drawing Sheets

Related U.S. Application Data filed on Nov. 11, 2014, provisional application No. 62/162,740, filed on May 16, 2015, provisional application No. 62/171,246, filed on Jun. 5, 2015.

(51) Int. Cl.

| | | |
|---|---|---|
| *H04W 8/18* | (2009.01) | |
| *H04W 4/24* | (2018.01) | |
| *H04W 12/06* | (2009.01) | |
| *H04W 4/50* | (2018.01) | |
| *H04M 15/00* | (2006.01) | |
| *H04W 8/20* | (2009.01) | |
| *H04L 29/08* | (2006.01) | |
| *H04B 1/3816* | (2015.01) | |
| *H04W 84/04* | (2009.01) | |
| *G06F 9/455* | (2018.01) | |
| *G06F 21/64* | (2013.01) | |
| *H04L 29/06* | (2006.01) | |
| *H04W 12/04* | (2009.01) | |
| *H04W 4/60* | (2018.01) | |

(52) U.S. Cl.
CPC ....... *H04B 1/3816* (2013.01); *H04L 63/0861* (2013.01); *H04L 67/30* (2013.01); *H04L 67/306* (2013.01); *H04M 15/56* (2013.01); *H04M 15/63* (2013.01); *H04M 15/7556* (2013.01); *H04M 15/8038* (2013.01); *H04W 4/24* (2013.01); *H04W 4/50* (2018.02); *H04W 4/60* (2018.02); *H04W 8/183* (2013.01); *H04W 12/04* (2013.01); *H04W 12/06* (2013.01); *H04W 84/042* (2013.01); *H04W 88/06* (2013.01); *H04W 88/02* (2013.01)

(56) References Cited

U.S. PATENT DOCUMENTS

| | | |
|---|---|---|
| 7,962,765 B2 | 6/2011 | Malcolm |
| 7,996,888 B2 | 8/2011 | Asunmaa et al. |
| 8,200,736 B2 | 6/2012 | Shi et al. |
| 8,238,965 B2 | 8/2012 | Baluja et al. |
| 8,274,938 B2 | 9/2012 | Chang et al. |
| 8,275,415 B2 | 9/2012 | Huslak |
| 8,331,990 B2 | 12/2012 | Larsson |
| 8,346,214 B2 | 1/2013 | Mohammed |
| 8,447,358 B2 | 5/2013 | Lee |
| 8,494,576 B1 | 7/2013 | Bye et al. |
| 8,498,615 B2 | 7/2013 | Mohammed et al. |
| 8,634,407 B2 | 1/2014 | Mohammed et al. |
| 8,649,765 B1 | 2/2014 | Hjelm et al. |
| 8,649,770 B1 | 2/2014 | Cope |
| 8,666,368 B2 | 3/2014 | Schell et al. |
| 8,707,022 B2 | 4/2014 | Haggerty et al. |
| 8,725,212 B2 | 5/2014 | Pattaswamy et al. |
| 9,204,300 B2 | 12/2015 | Park et al. |
| 9,716,788 B2 | 7/2017 | Bendi et al. |
| 2003/0190908 A1 | 10/2003 | Craven |
| 2004/0101114 A1 | 5/2004 | Maytal et al. |
| 2006/0075216 A1 | 4/2006 | Vaha-Sipila et al. |
| 2006/0078109 A1 | 4/2006 | Akashika et al. |
| 2006/0193295 A1 | 8/2006 | White et al. |
| 2007/0273518 A1 | 11/2007 | Lupoli et al. |
| 2008/0064443 A1 | 3/2008 | Shin et al. |
| 2010/0063906 A1 | 3/2010 | Nelsen et al. |
| 2010/0223368 A1 | 9/2010 | Runcie et al. |
| 2010/0311468 A1* | 12/2010 | Shi ............. H04W 4/003 455/558 |
| 2011/0028135 A1 | 2/2011 | Srinivasan |
| 2011/0074005 A1 | 3/2011 | Jaeger |
| 2011/0153437 A1 | 6/2011 | Archer et al. |
| 2011/0239307 A1 | 9/2011 | Joffray et al. |
| 2011/0269423 A1 | 11/2011 | Schell et al. |
| 2012/0108205 A1 | 5/2012 | Schell et al. |
| 2012/0108206 A1 | 5/2012 | Haggerty |
| 2013/0023235 A1 | 1/2013 | Fan et al. |
| 2013/0036231 A1 | 2/2013 | Shuumaki |
| 2013/0046972 A1 | 2/2013 | Campagna et al. |
| 2013/0165073 A1 | 6/2013 | Madsen |
| 2013/0166915 A1 | 6/2013 | Desai et al. |
| 2013/0208671 A1 | 8/2013 | Royz et al. |
| 2013/0276124 A1 | 10/2013 | Tahir et al. |
| 2013/0294041 A1 | 11/2013 | Syal |
| 2013/0329639 A1 | 12/2013 | Wietfeldt et al. |
| 2014/0004827 A1 | 1/2014 | O'Leary |
| 2014/0031035 A1 | 1/2014 | Tagg et al. |
| 2014/0038563 A1 | 2/2014 | O'Leary |
| 2014/0072681 A1 | 3/2014 | Dent |
| 2014/0073375 A1 | 3/2014 | Li et al. |
| 2014/0075506 A1 | 3/2014 | Davis et al. |
| 2014/0082358 A1 | 3/2014 | Nakhjiri et al. |
| 2014/0098957 A1 | 4/2014 | Larsson |
| 2014/0105259 A1 | 4/2014 | May-Weymann |
| 2014/0128060 A1 | 5/2014 | Vashi et al. |
| 2014/0165173 A1 | 6/2014 | Hjelm et al. |
| 2014/0194157 A1 | 7/2014 | Ezekiel et al. |
| 2014/0219447 A1 | 8/2014 | Park et al. |
| 2014/0310495 A1 | 10/2014 | Michelogiannakis et al. |
| 2014/0317686 A1 | 10/2014 | Vetillard |
| 2014/0342719 A1 | 11/2014 | Lindholm |
| 2015/0017950 A1 | 1/2015 | Zhao et al. |
| 2015/0081884 A1 | 3/2015 | Maguire et al. |
| 2015/0100753 A1 | 4/2015 | Shen et al. |
| 2015/0113617 A1 | 4/2015 | Chastain et al. |
| 2015/0163840 A1 | 6/2015 | Ji et al. |
| 2015/0200934 A1 | 7/2015 | Naguib |
| 2015/0271662 A1 | 9/2015 | Lhamon et al. |
| 2015/0289129 A1 | 10/2015 | Li et al. |
| 2015/0301975 A1 | 10/2015 | Garg et al. |
| 2015/0304506 A1 | 10/2015 | Zhu et al. |
| 2015/0334111 A1 | 11/2015 | Ziat |
| 2015/0341791 A1 | 11/2015 | Yang et al. |
| 2015/0347786 A1 | 12/2015 | Yang et al. |
| 2015/0350877 A1 | 12/2015 | Li et al. |
| 2015/0350879 A1 | 12/2015 | Li et al. |
| 2015/0350880 A1 | 12/2015 | Li et al. |
| 2015/0373530 A1* | 12/2015 | Stein ............. H04L 63/0853 455/411 |
| 2016/0007190 A1 | 1/2016 | Wane |
| 2016/0057624 A1 | 2/2016 | Yang et al. |
| 2016/0088464 A1 | 3/2016 | Hans |
| 2016/0149877 A1 | 5/2016 | Kancharla et al. |
| 2016/0277394 A1 | 9/2016 | Berthet |
| 2016/0330608 A1 | 11/2016 | Benn |
| 2017/0094628 A1 | 3/2017 | Miao et al. |
| 2017/0150355 A1 | 5/2017 | Bergius et al. |
| 2017/0344939 A1 | 11/2017 | Linton et al. |
| 2018/0032771 A1 | 2/2018 | Lupoli et al. |

FOREIGN PATENT DOCUMENTS

| | | |
|---|---|---|
| WO | WO 2011/106569 A2 | 9/2011 |
| WO | WO 2012 076437 A2 | 6/2012 |
| WO | WO 2012/154600 | 11/2012 |
| WO | WO 2012/174461 | 12/2012 |
| WO | WO 2014/018356 | 1/2014 |
| WO | WO 2014/032081 | 3/2014 |
| WO | WO 2014/088874 | 6/2014 |
| WO | WO 2014/101094 A1 | 7/2014 |

OTHER PUBLICATIONS

Li, C. et al., *A Trusted Virtual Machine in an Untrusted Management Environment.*

In Re: Ismaila Wane; U.S. Application titled Apparatus, Methods and System for a Trusted Subscription Management Platform; U.S. Appl. No. 62/051,311, filed Sep. 17, 2014, 39 pages.

In Re: Ismaila Wane; U.S. Application titled Methods for a System-On-Chip with Integrated Reprogrammable Cellular Network Connectivity; U.S. Appl. No. 62/078,006, filed Nov. 11, 2014, 20 pages In Re: Ismaila Wane; U.S. Application titled Method for Virtual-

(56) References Cited

OTHER PUBLICATIONS izing a Reprogrammable Universal Integrated Circuit Chip on an Application Processor; U.S. Appl. No. 62/162,740, filed May 16, 2015, 18 pages.
In Re: Ismaila Wane; U.S. Application titled Method for Configuring a Trusted Java Card Virtual Machine Using Biometric Information; U.S. Appl. No. 62/171,246, file Jun. 5, 2015, 16 pages.
In Re: Ismaila Wane; U.S. Application titled Apparatuses, Methods and Systems for Implementing a System-On-Chip with Integrated Reprogrammable Cellular Network Connectivity; U.S. Appl. No. 14/934,310, filed Nov. 6, 2015, 32 pages
International Search Report and Written Opinion for International Application, No. PCT/IB2015/058681 dated Feb. 19, 2016, 20 pages.
Office Action for U.S. Appl. No. 15/040,425 dated Apr. 20, 2016, 14 pages.
Vahidian, E., *Evolution of the SIM to eSIM*, NTNU Norwegian University of Science and Technology, Jan. 21, 2013. Retrieved from the Internet: URL: http://www.diva-portal.org/smash/get/diva2:617036/fulltext01.pdf [retrieved on Jun. 9, 2016]. 110 pages.
International Search Report and Written Opinion for International Application No. PCT/IB2016/050708 dated May 25, 2016, 16 pages.
International Search Report and Written Opinion for International Application No. PCT/IB2015/057178 dated Jun. 2, 2016, 16 pages.
Reprogrammable SIMS: Technology, Evolution and Implications [online] [retrieved Oct. 23, 2015]. Retrieved from the Internet: <URL:http://stakeholders.ofcom.org.uk/binaries/research/telecoms-research/reprogramable-sims.pdf>. (dated Sep. 25, 2012) 95 pages.
Remote Provisioning Architecture for Embedded UICC Technical Specification Version 1.0 Dec. 17, 2013 [online] [retrieved Oct. 23, 2015]. Retrieved from the Internet: <URL:http://www.gsma.com/connectedliving/wp-content/uploads/2014/01/2.-GSMA-Remote-Provisioning-Architecture-for-Embedded-UICC-Technical-Specifcation-Version-1.0.pdf>. (dated Dec. 17, 2013) 294 pages
Ravichandran et al. "Network on Chip with CDMA Technique", Journal of Scientific & Industrial Research, vol. 73, Apr. 2014, pp. 209-213.
Notice of Allowance for U.S. Appl. No. 15/040,425 dated Aug. 23, 2016.
2nd Written Opinion for International Application No. PCT/IB2015/057178 dated Sep. 29, 2016.
Office Action for U.S. Appl. No. 14/856,974 dated Jun. 16, 2016.
Office Action for U.S. Appl. No. 14/934,310 dated Jul. 1, 2016.
2nd Written Opinion for International Application No. PCT/IB2016/050708 dated Apr. 25, 2017, 13 pages.
International Preliminary Report on Patentability (Chapter II) from International Application No. PCT/IB2016/050708, dated Aug. 18, 2017, 34 pages.
Notice of Allowance for U.S. Appl. No. 15/040,410 dated Oct. 11, 2017, 35 pages.
Office Action for U.S. Appl. No. 14/856,974 dated Jan. 3, 2017, 18 pages.
Office Action for U.S. Appl. No. 14/934,310 dated Sep. 18, 2017, 12 pages.
Office Action for U.S. Appl. No. 15/283,491 dated Jun. 1, 2017, 15 pages.
Office Action for U.S. Appl. No. 14/934,310 dated Mar. 3, 2017.
Notice of Allowance from U.S. Appl. No. 14/856,974, dated Jan. 22, 2018, 12 pages.
Panel Decision from Pre-Appeal Brief Review for U.S. Appl. No. 15/283,491 dated Apr. 30, 2018.
Office Action for U.S. Appl. No. 15/283,491 dated May 17, 2018, 10 pages.
Office Action for U.S. Appl. No. 14/934,310 dated Jun. 26, 2018, 8 pages.

\* cited by examiner

APPARATUSES, METHODS AND SYSTEMS FOR IMPLEMENTING A TRUSTED SUBSCRIPTION MANAGEMENT PLATFORM

CROSS-REFERENCE TO RELATED APPLICATIONS

This application claims the benefit of: U.S. Provisional Patent Application No. 62/051,311, filed Sep. 17, 2014; U.S. Provisional Patent Application No. 62/078,006, filed Nov. 11, 2014; U.S. Provisional Patent Application No. 62/162,740, filed May 16, 2015; and U.S. Provisional Patent Application No. 62/171,246, filed Jun. 5, 2015. The entire contents of each of these applications are incorporated herein by reference.

TECHNOLOGICAL FIELD

Example embodiments of the present invention relate generally to the field of telecommunications, and more particularly, to the configuration and usage of cellular equipment in conjunction with virtualized Subscription Identity Module (SIM) cards.

BACKGROUND

With over 60% smartphone penetration for newly shipped devices, there will be over 5 billion smartphones by 2020 produced by thousands of Original Equipment Manufacturers (OEMs). With over 1,500 Mobile Network Operators (MNOs) and Mobile Virtual Network Operators (MVNOs) globally, the telecommunications industry is a $1.4+ trillion industry with voice accounting for over $664 billion. Additionally, there are over 6.7 billion mobile subscriptions around the world today with an average of 2+ SIM cards per wireless subscriber in various geographic markets.

Indeed, many wireless subscribers around the world need to carry multiple SIM cards for various personal and professional reasons. This has led to the recent growth in demand for dual-SIM card phones or even triple-SIM card phones in some parts of the world. However, as more MNOs and MVNOs are established in various geographic markets (e.g., 4 or more mobile operators per country), it becomes more and more inconvenient for consumers to access the various proprietary networks.

In other words, there is a clear friction in accessing local cellular networks faced by consumers either as travelers in international roaming situations or residents in geographic areas with multiple MNOs and MVNOs.

SIM cards have evolved other the past few years and their form factors will ineluctably change further in the future. From the standard 2FF card (mini-SIM) to the 4FF card (nano-SIM), it has now evolved to the MFF2 form factor, which is mainly used in machine-to-machine (M2M) applications. Introduced into consumer devices, the MFF2 form factor and its subsequent iterations could radically change the manufacturing, distribution and usage of mobile phones and SIM cards, potentially enabling a new telecommunications ecosystem.

In December of 2013, the GSM Association (GSMA), which is the largest association of mobile operators and related companies, essentially standardized reprogrammable SIM cards. As a result of the standardization efforts, many new use cases will be soon possible in an interoperable manner. These use cases include the ability to seamlessly select and switch cellular networks without physically changing SIM cards.

Although the GSMA's specifications were developed primarily for M2M devices, nothing prevents those skilled in the art from using them for consumer devices. Doing so would therefore remove the current friction of switching networks faced by consumers in international roaming situations or in local geographic areas with multiple cellular carriers. This empowers consumers with the ability to dynamically change cellular networks to extract the best value for mobile communication needs, based on their personal priorities for price, data speed, network quality, etc. It also eliminates the need for carrying multiple separate devices and may prevent device-theft if SIM cards were to be fully virtualized (i.e., virtual SIM card technology) and tightly integrated with the mobile equipment.

For local telecom regulators, virtual SIM card technology lowers the barriers to switching for consumers and thereby fosters a healthy and competitive telecommunications landscape in which MNOs and MVNOs compete on price, service quality and innovation.

For OEMs, virtual SIM card technology provides more space in the printed circuit board assembly (PCBA) design, allowing the incorporation of additional sensors or other chip components. It also removes the complexity of dealing with various SIM card vendors approved by MNOs in a kitting environment for subsidized phones. Furthermore, it could be a key differentiator for early adopters in the highly competitive mobile phone market.

MNOs stand to immensely benefit from virtual SIM card technology as well. The technology may facilitate enhanced distribution because consumers would no longer need to travel to a store to purchase a SIM card and sign up for service. MNO service discovery, selection and provisioning could all take place on the device itself, through an easy to use mobile application. Such a mobile application could then help effectively streamline the redundant Know Your Customer (KYC) procedures currently in effect in many countries. Moreover, for all MNOs, regardless of market position, this technology can eliminate the costs of procuring, testing, certifying and distributing physical SIM cards by removing the inherent logistical complexities associated with managing physical SIM cards. This will enable MNOs to better focus capital spend and management attention on network capacity, coverage and other differentiated services. Ultimately, this technology may reduce the current cost of acquiring and retaining subscribers, potentially improving thus the bottom line for MNOs.

Finally, virtual SIM card technology may provide important environmental benefits by lowering the overall volume of manufactured SIM cards globally. It remains unclear if most of the billions of SIM cards produced each year are still not halogen-free as halogen is toxically corrosive, which therefore has the potential to damage people's health and their environment.

There have been various disclosures relating to virtual SIM card technology. However, none of these disclosures have presented a unified end-to-end system and associated methods to create, distribute and manage virtual SIM cards in conjunction with specific software and hardware configurations for a mobile station operating in multi-SIM, multi-active mode with Voice over IP (VoIP) capability. In fact, there are no mobile phones available in the market that are claimed to utilize an embedded Universal Integrated Circuit Card (eUICC) or a plurality of concurrent eUICCs (e.g., using virtual SIM card technology) while featuring a multi- SIM, multi-active mode of operation. Such an apparatus would naturally require developing the corresponding server infrastructure, thus creating a specific system and implementing various non-trivial procedures.

BRIEF SUMMARY

Example embodiments described herein provide equipment and systems for accomplishing these goals. The equipment described herein may, for instance, comprise an apparatus operating as a cellular phone, although other embodiments are envisioned as well. As described in greater detail below, an example apparatus comprises a secure mobile equipment that uses an enhanced phone application integrated with VoIP functionality and standard phone application features (e.g. Dialer, Contacts, Messages, Call History, Voicemail, Settings, etc.). Example apparatuses contemplated herein can remotely communicate with a backend server for subscription and VoIP functions to provide consumers with a better communication experience.

An example apparatus, as contemplated herein, may hereinafter be referred to as mobile station (MS), such as a cellular phone, and may allow wireless subscribers to download, display, manage and use a plurality of concurrent virtual SIM cards from a user-friendly resident mobile application. In this regard, the MS may be connected to one or more of a plurality of local and/or remote eUICCs, and may generally be marketed as not requiring a physical SIM card.

Embodiments of the MS described herein are configured to operate in conjunction with a backend server system. The backend server system is composed of various components facilitating the secure creation, provisioning and management of virtual SIM cards. Accordingly, as described in greater detail below, example methods, apparatuses, and computer program products as described herein implement a system enabling the secure provisioning, storage, display, usage and management of virtual SIM cards.

In a first example embodiment, a server device is provided. The server device includes at least one processor and at least one memory storing computer-executable instructions that, when executed by the at least one processor, cause the server device to transmit, to a trusted user interface (UI) client of a mobile station, information regarding a set of virtual subscriber identity module (SIM) cards associated with the mobile station, and receive, from the trusted UI client of the mobile station, a request to provision a particular virtual SIM card. The computer-executable instructions, when executed by the at least one processor, further cause the server device to initiate, by a subscription manager-secure routing (SM-SR) module of the server device and via a trusted baseband client of the mobile device, a secure proxy channel between the server device and a profile manager that hosts the particular virtual SIM card, and transmit, via the secure proxy channel and to the profile manager, an instruction regarding the particular virtual SIM card.

In some embodiments, the computer-executable instructions, when executed by the at least one processor, further cause the server device to transmit, to the trusted UI client of the mobile station, information regarding a set of virtual SIM cards offered by a trusted virtual store associated with the server device, wherein the request to provision the particular virtual SIM card comprises a request to purchase a virtual SIM card selected from the set of virtual SIM cards offered by the trusted virtual store.

In some embodiments, the computer-executable instructions, when executed by the at least one processor, further cause the server device to create the secure proxy channel between the server device and a profile manager using a mutual authentication procedure.

In some embodiments, the computer-executable instructions, when executed by the at least one processor, further cause the server device to register the mobile station. In some such embodiments, the computer-executable instructions, when executed by the at least one processor, further cause the server device to register the mobile station by causing the server device to assign the mobile station a unique random cryptographic key. Additionally or alternatively, registration of the mobile station may establish that no additional registrations are required for newly purchased virtual SIM cards.

In some embodiments, the request to provision the particular virtual SIM card of the set of virtual SIM cards comprises a request to: purchase a virtual SIM card; activate a virtual SIM card; deactivate a virtual SIM card; or delete a virtual SIM card. In this regard, the request to provision the particular virtual SIM card of the set of virtual SIM cards may be received from the trusted UI client of the mobile station via an internet protocol (IP) channel.

In another example embodiment, a method is provided. The method includes transmitting, by a server device and to a trusted user interface (UI) client of a mobile station, information regarding a set of virtual subscriber identity module (SIM) cards associated with the mobile station, and receiving, from the trusted UI client of the mobile station, a request to provision a particular virtual SIM card. The method further includes initiating, by a subscription manager-secure routing (SM-SR) module of the server device and via a trusted baseband client of the mobile device, a secure proxy channel between the server device and a profile manager that hosts the particular virtual SIM card, and transmitting, via the secure proxy channel and to the profile manager, an instruction regarding the particular virtual SIM card.

In some embodiments, the method further includes transmitting, to the trusted UI client of the mobile station, information regarding a set of virtual SIM cards offered by a trusted virtual store associated with the server device, wherein the request to provision the particular virtual SIM card comprises a request to purchase a virtual SIM card selected from the set of virtual SIM cards offered by the trusted virtual store.

In some embodiments, the method further includes creating the secure proxy channel between the server device and a profile manager using a mutual authentication procedure.

In some embodiments, the method further includes registering the mobile station. In some such embodiments, registering the mobile station includes causing the server device to assign the mobile station a unique random cryptographic key. Additionally or alternatively, registration of the mobile station may establish that no additional registrations are required for newly purchased virtual SIM cards.

In some embodiments, the request to provision the particular virtual SIM card of the set of virtual SIM cards comprises a request to: purchase a virtual SIM card; activate a virtual SIM card; deactivate a virtual SIM card; or delete a virtual SIM card. In this regard, the request to provision the particular virtual SIM card of the set of virtual SIM cards may be received from the trusted UI client of the mobile station via an internet protocol (IP) channel.

In yet another example embodiment, a non-transitory computer readable storage medium is provided that stores computer-executable instructions. The computer-executable instructions, when executed, cause a server device to transmit, to a trusted user interface (UI) client of a mobile station, information regarding a set of virtual subscriber identity module (SIM) cards associated with the mobile station, and receive, from the trusted UI client of the mobile station, a request to provision a particular virtual SIM card. The computer-executable instructions, when executed, further cause the server device to initiate, by a subscription manager-secure routing (SM-SR) module of the server device and via a trusted baseband client of the mobile device, a secure proxy channel between the server device and a profile manager that hosts the particular virtual SIM card, and transmit, via the secure proxy channel and to the profile manager, an instruction regarding the particular virtual SIM card.

In some embodiments, the computer-executable instructions, when executed, further cause the server device to transmit, to the trusted UI client of the mobile station, information regarding a set of virtual SIM cards offered by a trusted virtual store associated with the server device, wherein the request to provision the particular virtual SIM card comprises a request to purchase a virtual SIM card selected from the set of virtual SIM cards offered by the trusted virtual store.

In some embodiments, the computer-executable instructions, when executed, further cause the server device to create the secure proxy channel between the server device and a profile manager using a mutual authentication procedure.

In some embodiments, the computer-executable instructions, when executed, further cause the server device to register the mobile station. In some such embodiments, the computer-executable instructions, when executed, further cause the server device of the mobile station may establish that no additional registrations are required for newly purchased virtual SIM cards.

In some embodiments, the request to provision the particular virtual SIM card of the set of virtual SIM cards comprises a request to: purchase a virtual SIM card; activate a virtual SIM card; deactivate a virtual SIM card; or delete a virtual SIM card. In this regard, the request to provision the particular virtual SIM card of the set of virtual SIM cards may be received from the trusted UI client of the mobile station via an internet protocol (IP) channel.

In yet another example embodiment, an apparatus is provided. The apparatus includes means for transmitting, to a trusted user interface (UI) client of a mobile station, information regarding a set of virtual subscriber identity module (SIM) cards associated with the mobile station, and means for receiving, from the trusted UI client of the mobile station, a request to provision a particular virtual SIM card. The apparatus further includes means for initiating, via a trusted baseband client of the mobile device, a secure proxy channel between the apparatus and a profile manager that hosts the particular virtual SIM card, and means for transmitting, via the secure proxy channel and to the profile manager, an instruction regarding the particular virtual SIM card.

In some embodiments, the apparatus further includes means for transmitting, to the trusted UI client of the mobile station, information regarding a set of virtual SIM cards offered by a trusted virtual store associated with the server device, wherein the request to provision the particular virtual SIM card comprises a request to purchase a virtual SIM card selected from the set of virtual SIM cards offered by the trusted virtual store.

In some embodiments, the apparatus further includes means for creating the secure proxy channel between the server device and a profile manager using a mutual authentication procedure.

In some embodiments, the apparatus further includes means for registering the mobile station. In some such embodiments, registering the mobile station includes causing the apparatus to assign the mobile station a unique random cryptographic key. Additionally or alternatively, registration of the mobile station may establish that no additional registrations are required for newly purchased virtual SIM cards.

In some embodiments, the means for requesting provisioning of the particular virtual SIM card of the set of virtual SIM cards comprises means for requesting to: purchase a virtual SIM card; activate a virtual SIM card; deactivate a virtual SIM card; or delete a virtual SIM card. In this regard, the means for requesting to provision the particular virtual SIM card of the set of virtual SIM cards may be received from the trusted UI client of the mobile station via an internet protocol (IP) channel.

The above summary is provided merely for purposes of summarizing some example embodiments to provide a basic understanding of some aspects of the present invention(s). Accordingly, it will be appreciated that the above-described embodiments are merely examples and should not be construed to narrow the scope or spirit of the invention in any way. It will be appreciated that the scope of the invention(s) encompasses many potential embodiments in addition to those here summarized, some of which will be further described below.

BRIEF DESCRIPTION OF THE DRAWINGS

Figure 1A:
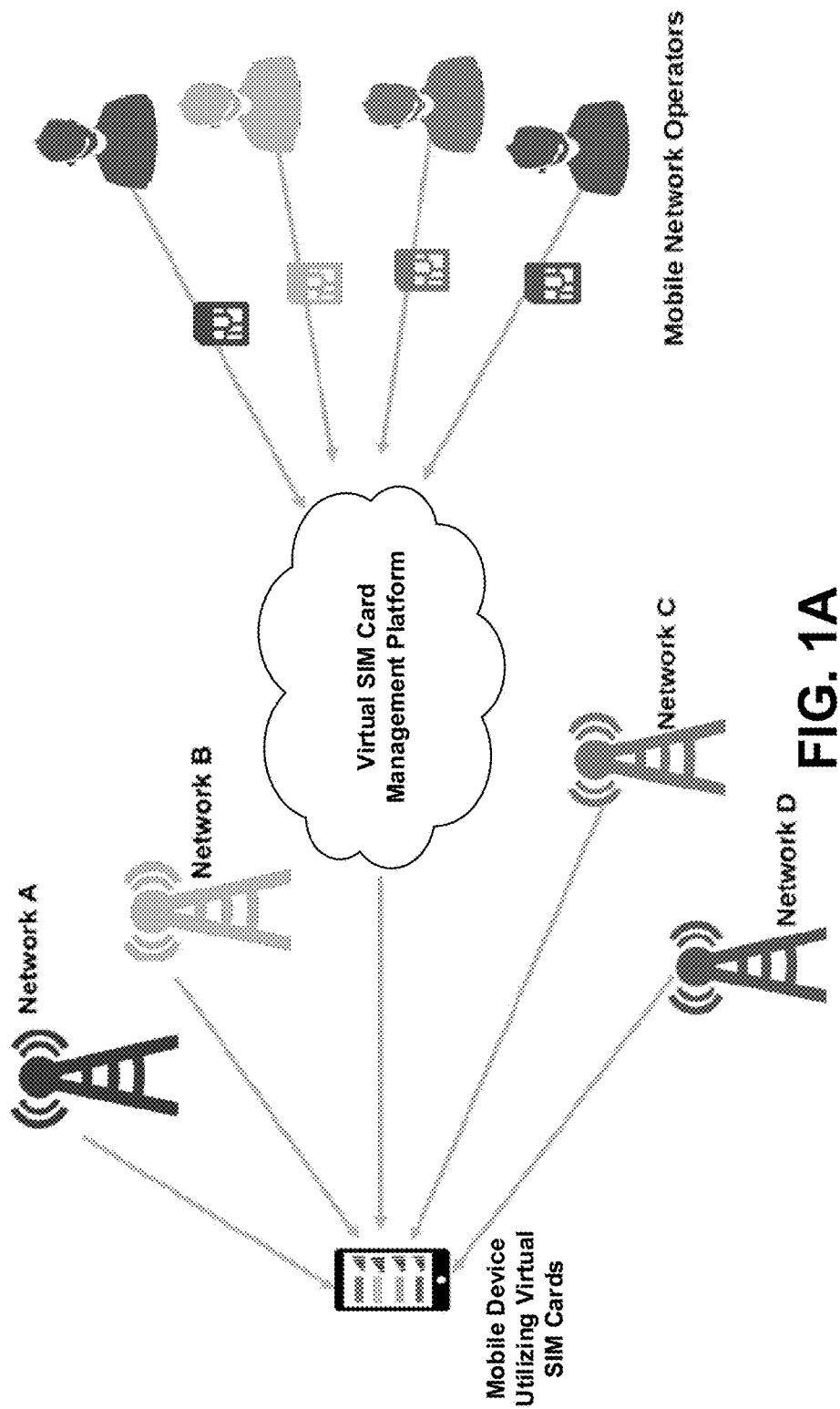
Figure 1B:
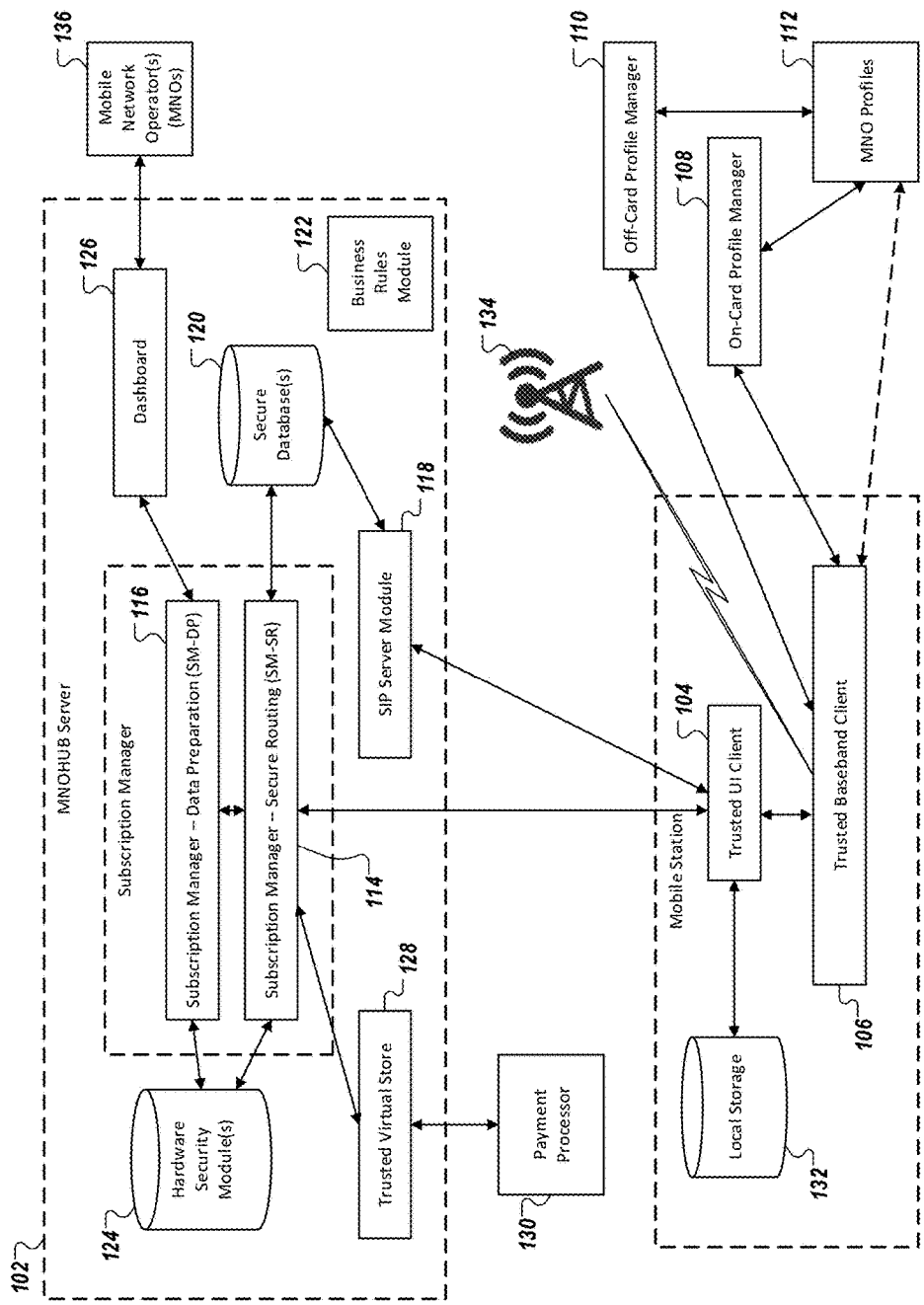
Figure 2:
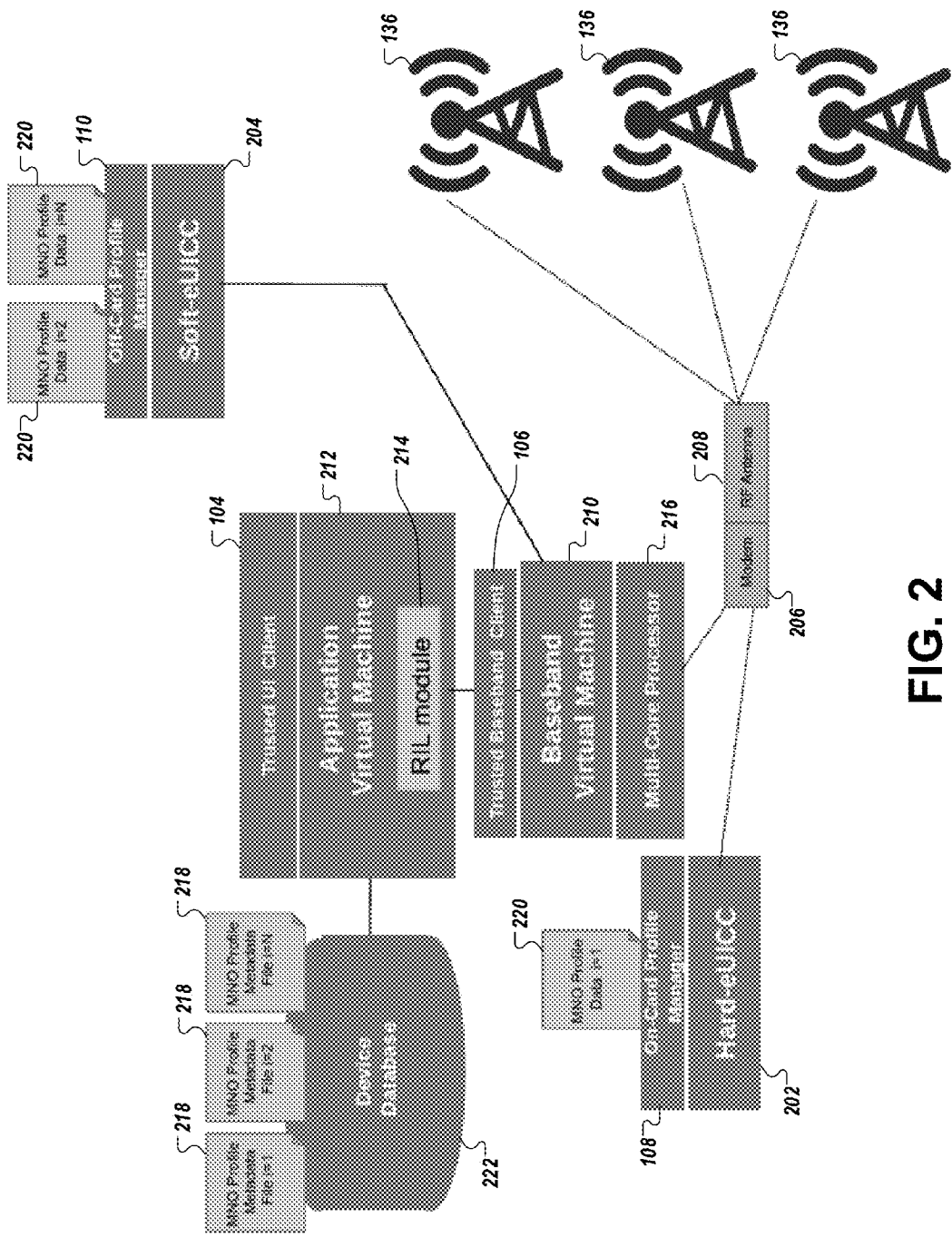
Figure 3:
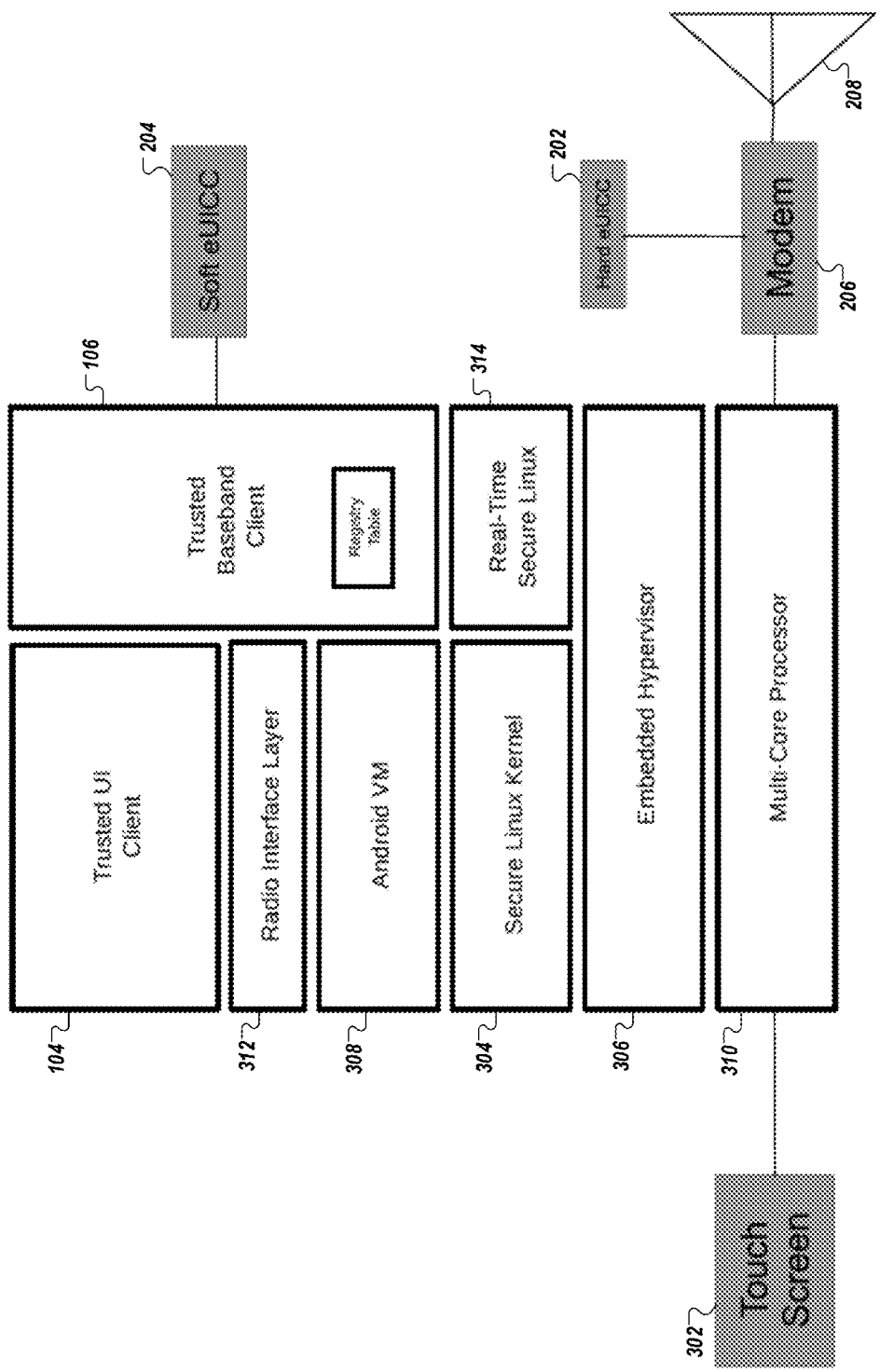
Figure 4A:
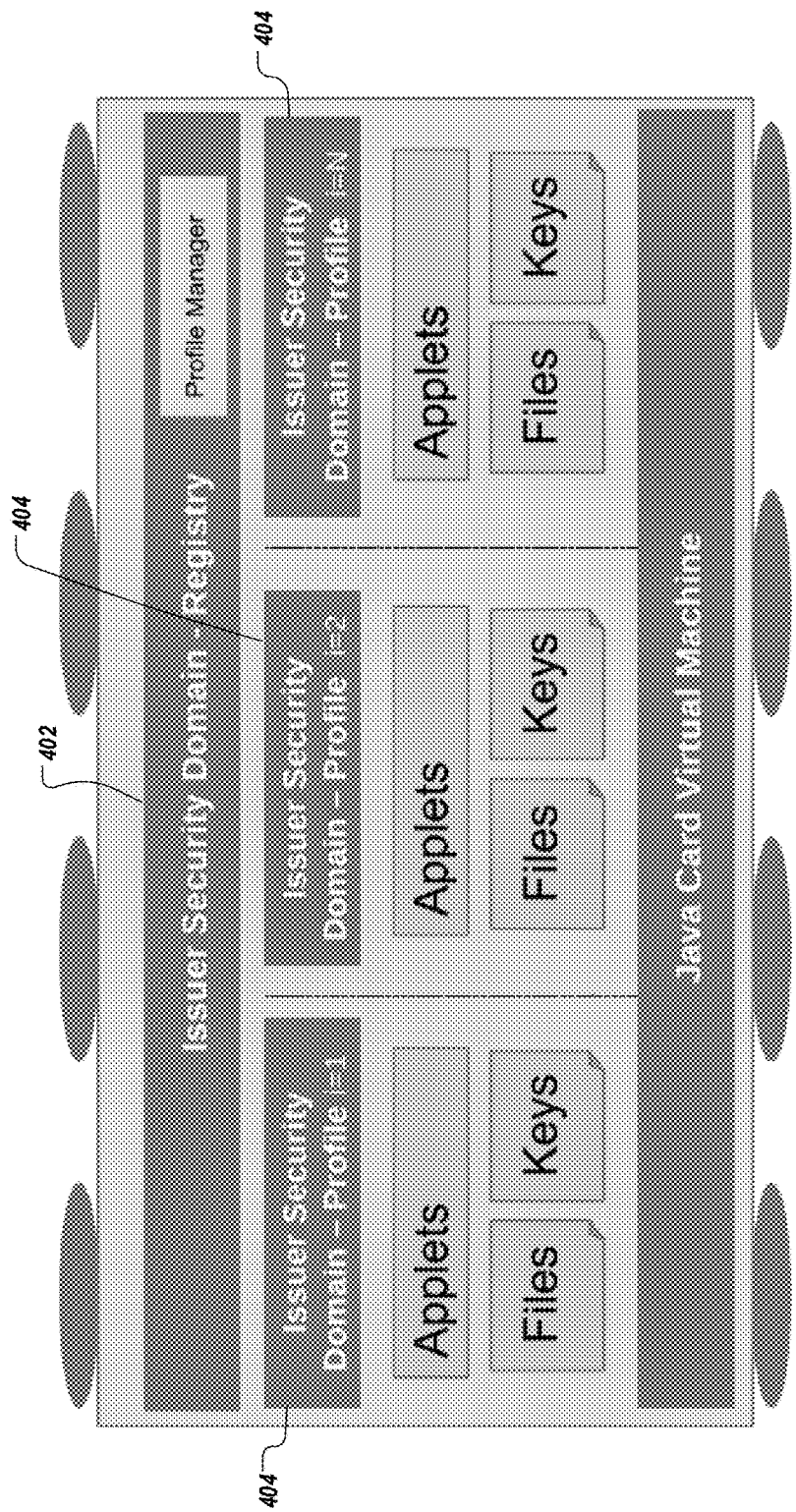

Having thus described the example embodiments of the invention in general terms, reference will now be made to the accompanying drawings, which are not necessarily drawn to scale, and wherein:

FIG. 1A provides a high-level system overview of an end-to-end virtual SIM platform, in accordance with example embodiments described herein;

FIG. 1B provides a high-level overview of a trusted subscription management platform, in accordance with example embodiments described herein;

FIG. 2 illustrates one configuration of a mobile station, in accordance with example embodiments described herein;

FIG. 3 illustrates another configuration of a mobile station, in accordance with example embodiments described herein;

FIG. 4A illustrates an example profile manager architecture with multiple MNO profiles defined as ISD-Ps that may be utilized by example embodiments described herein.

Figure 4B:
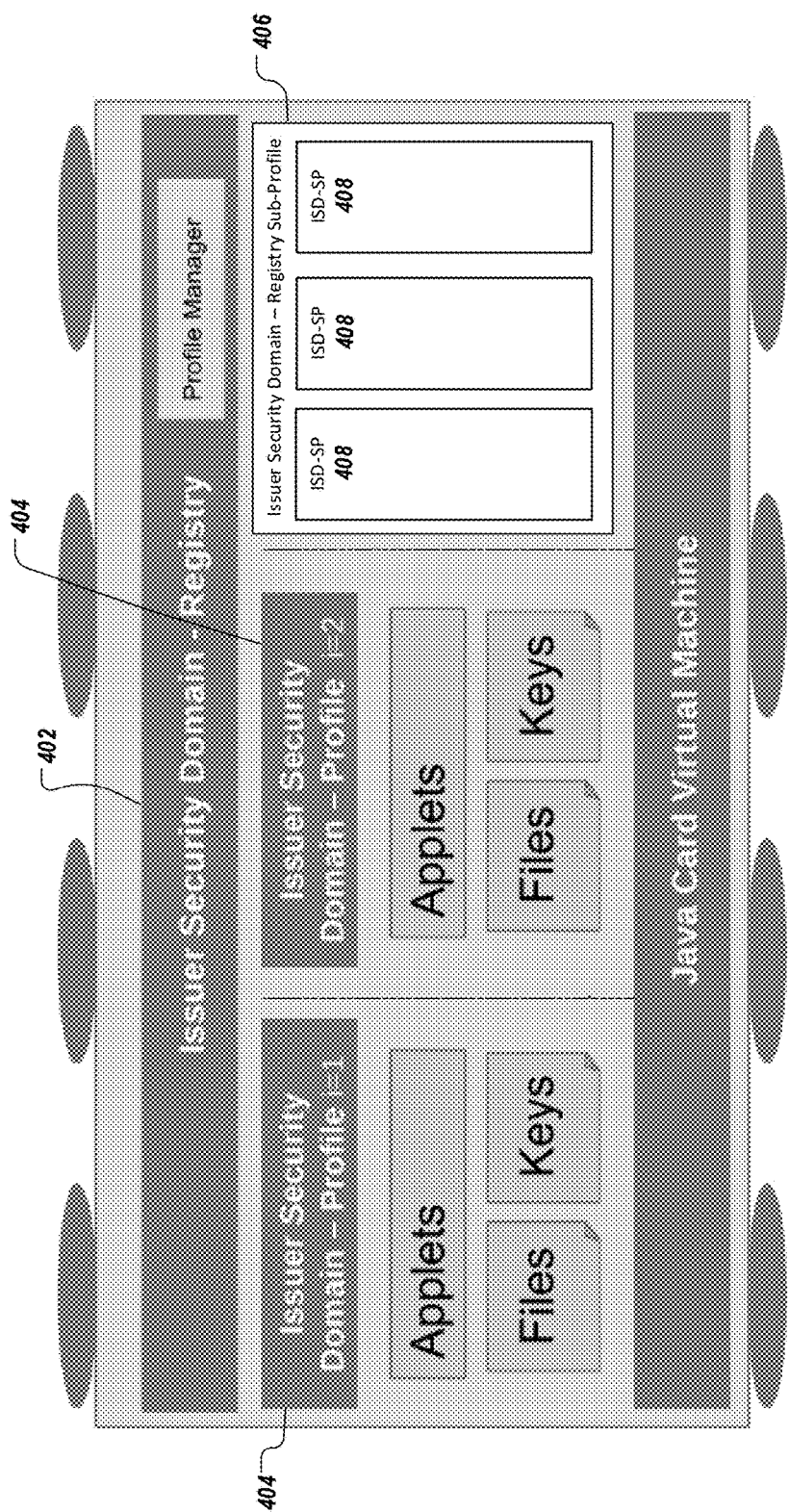
Figure 5:
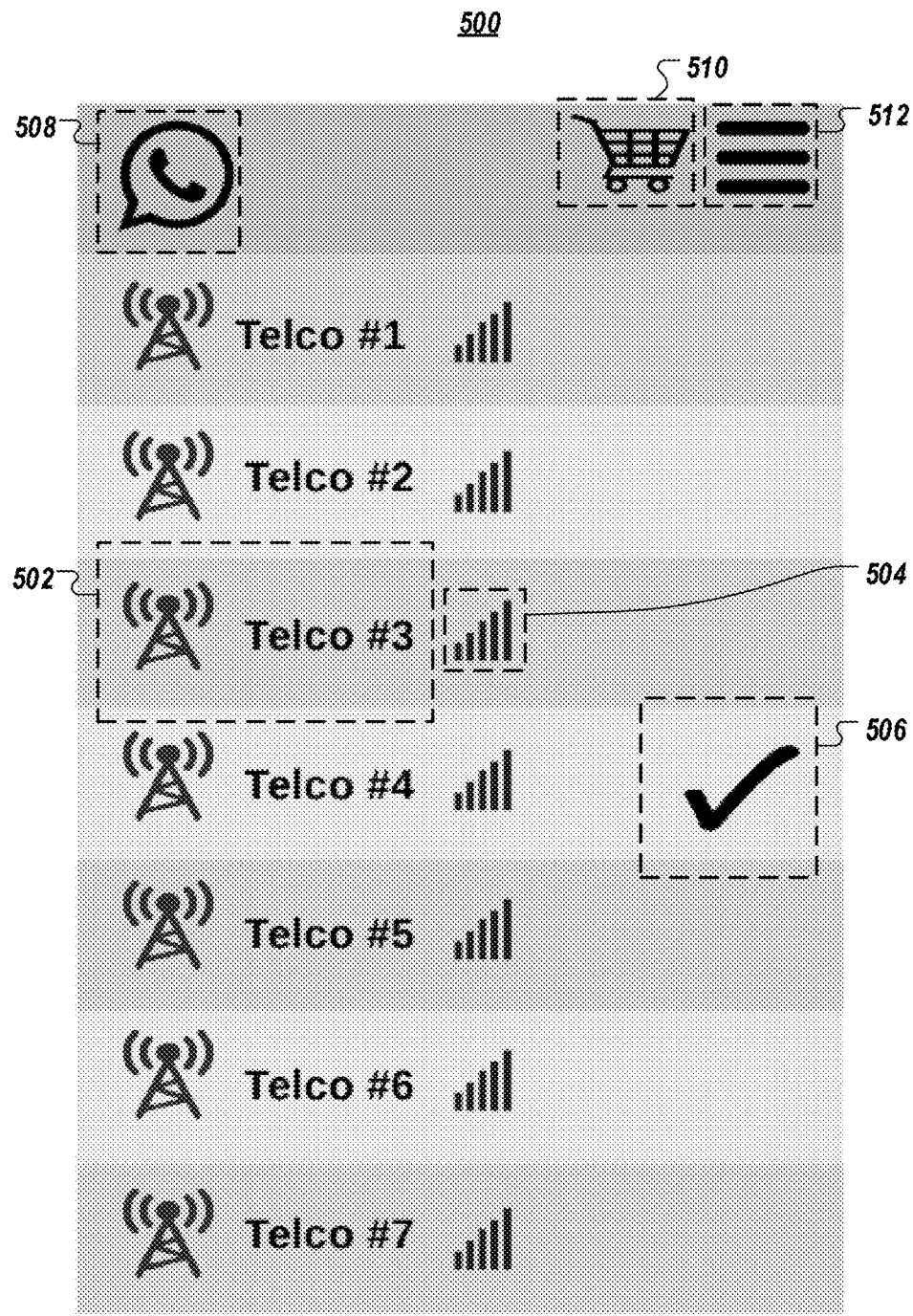
Figure 6:
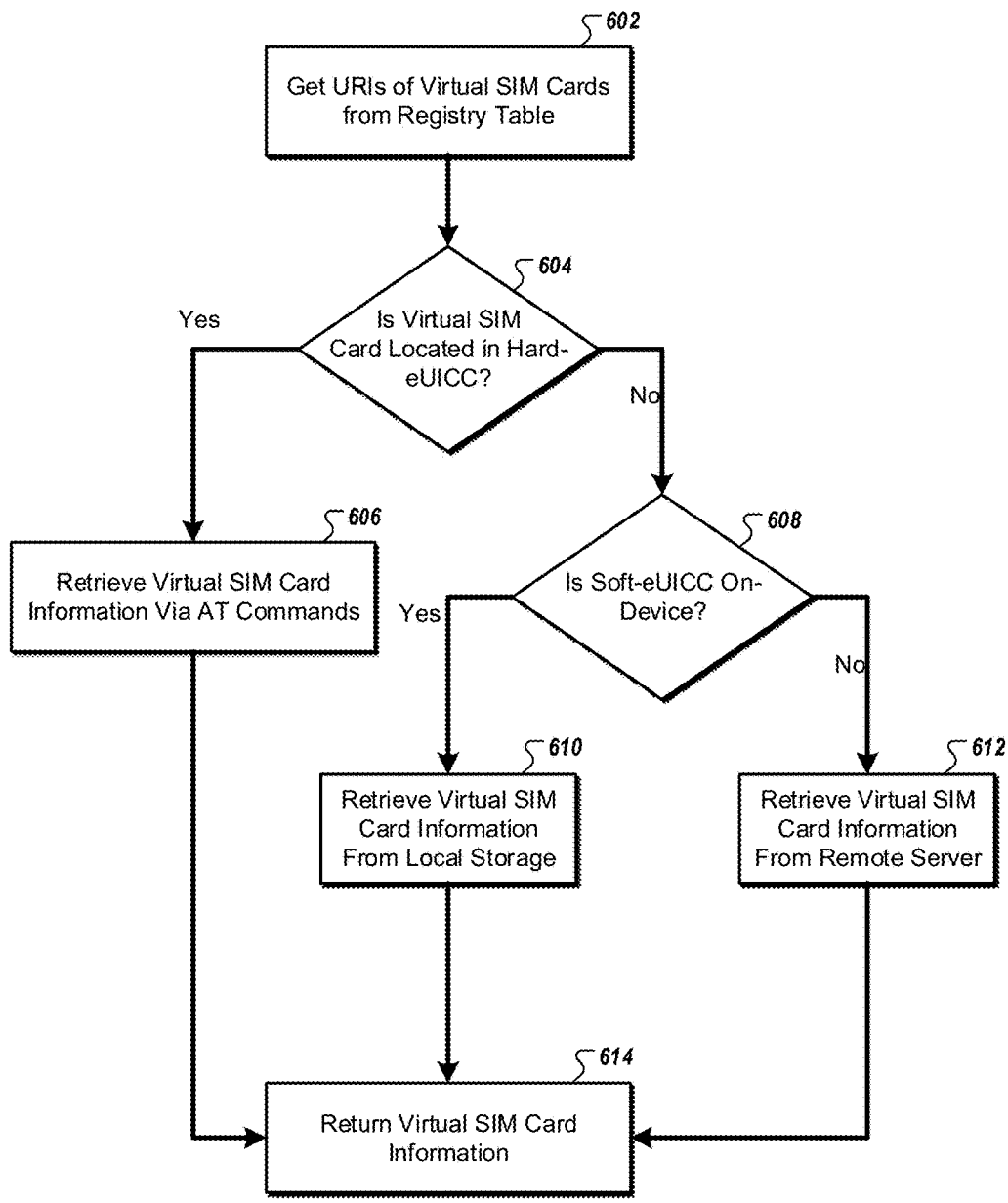
Figure 7:
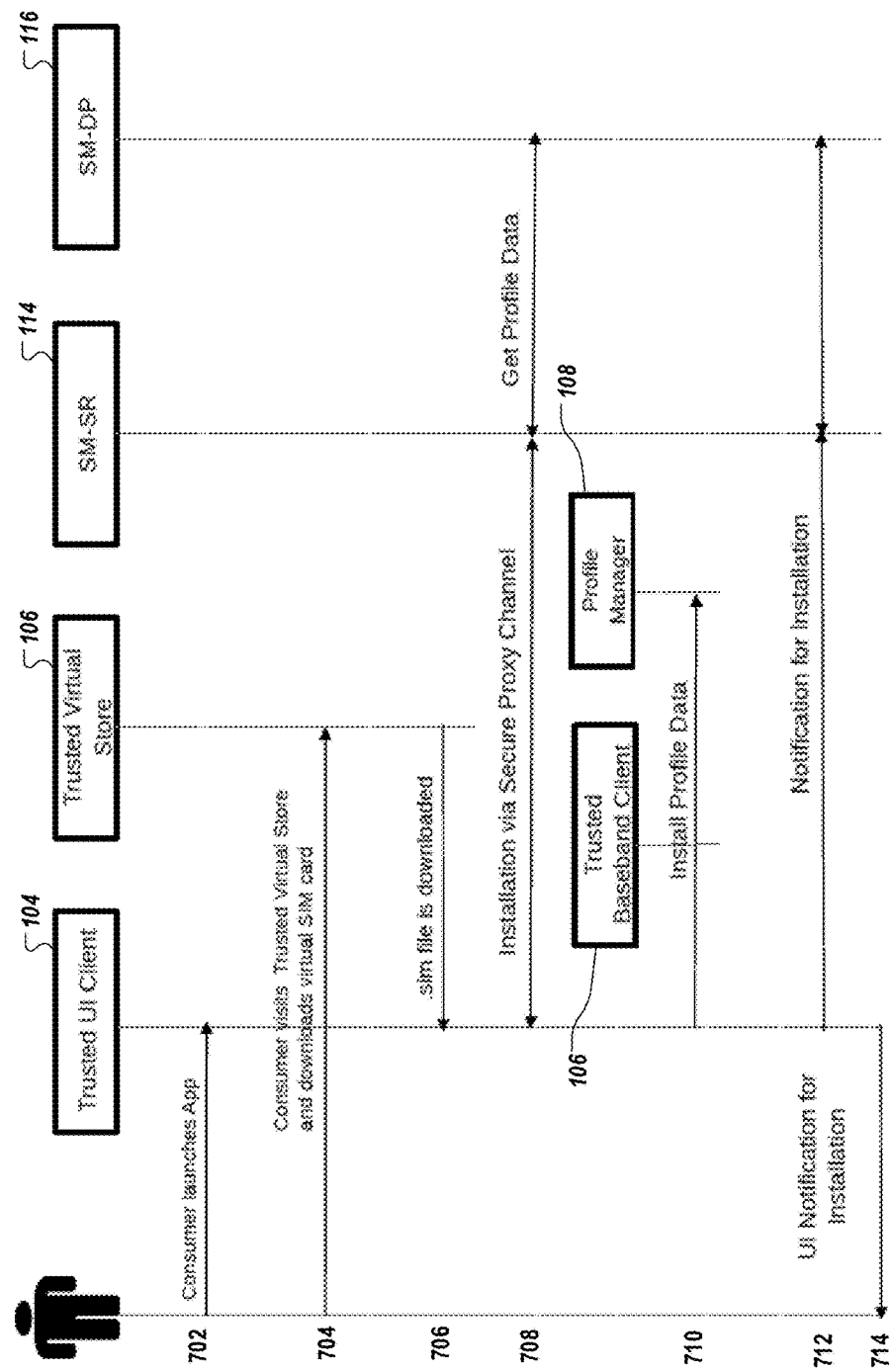
Figure 8:
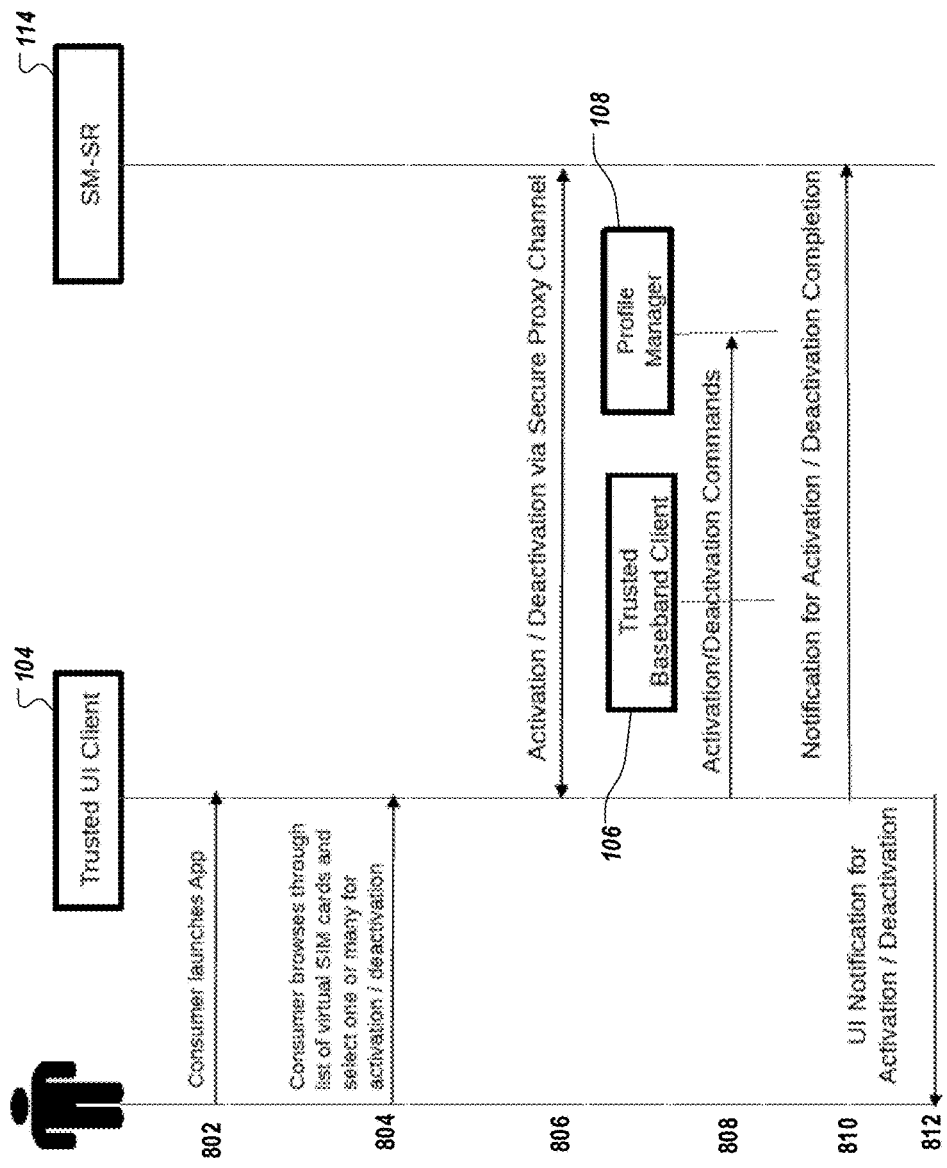
Figure 9:
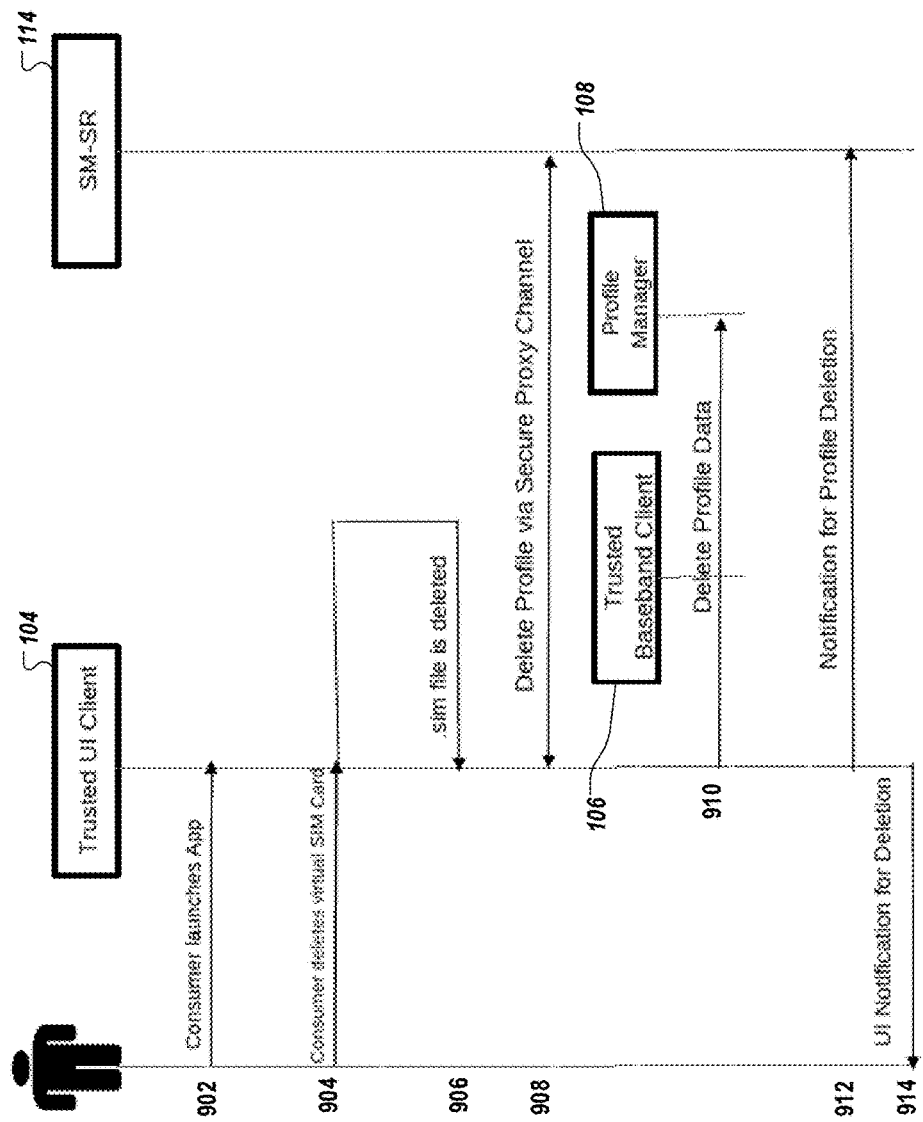
Figure 10:
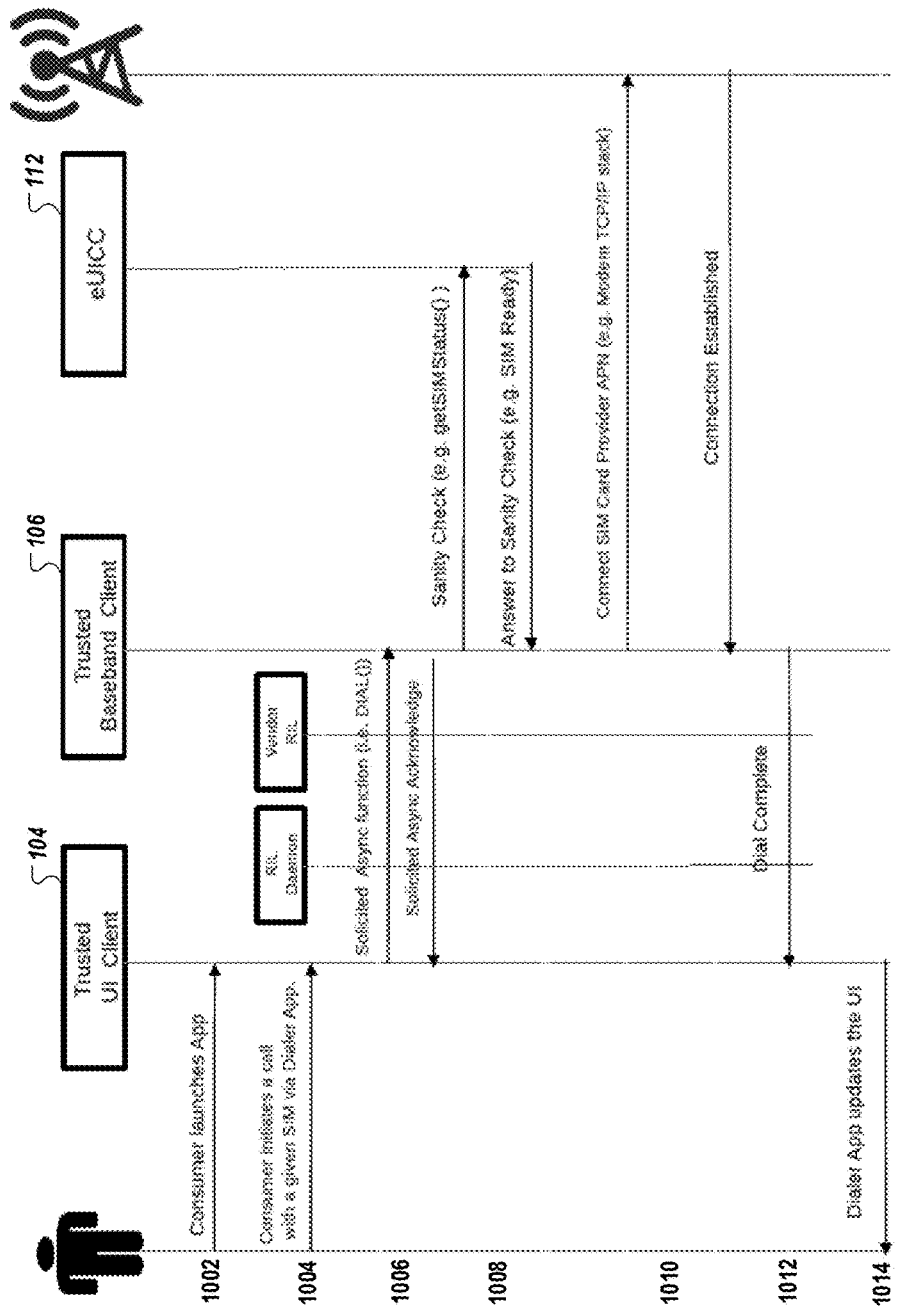
Figure 11:
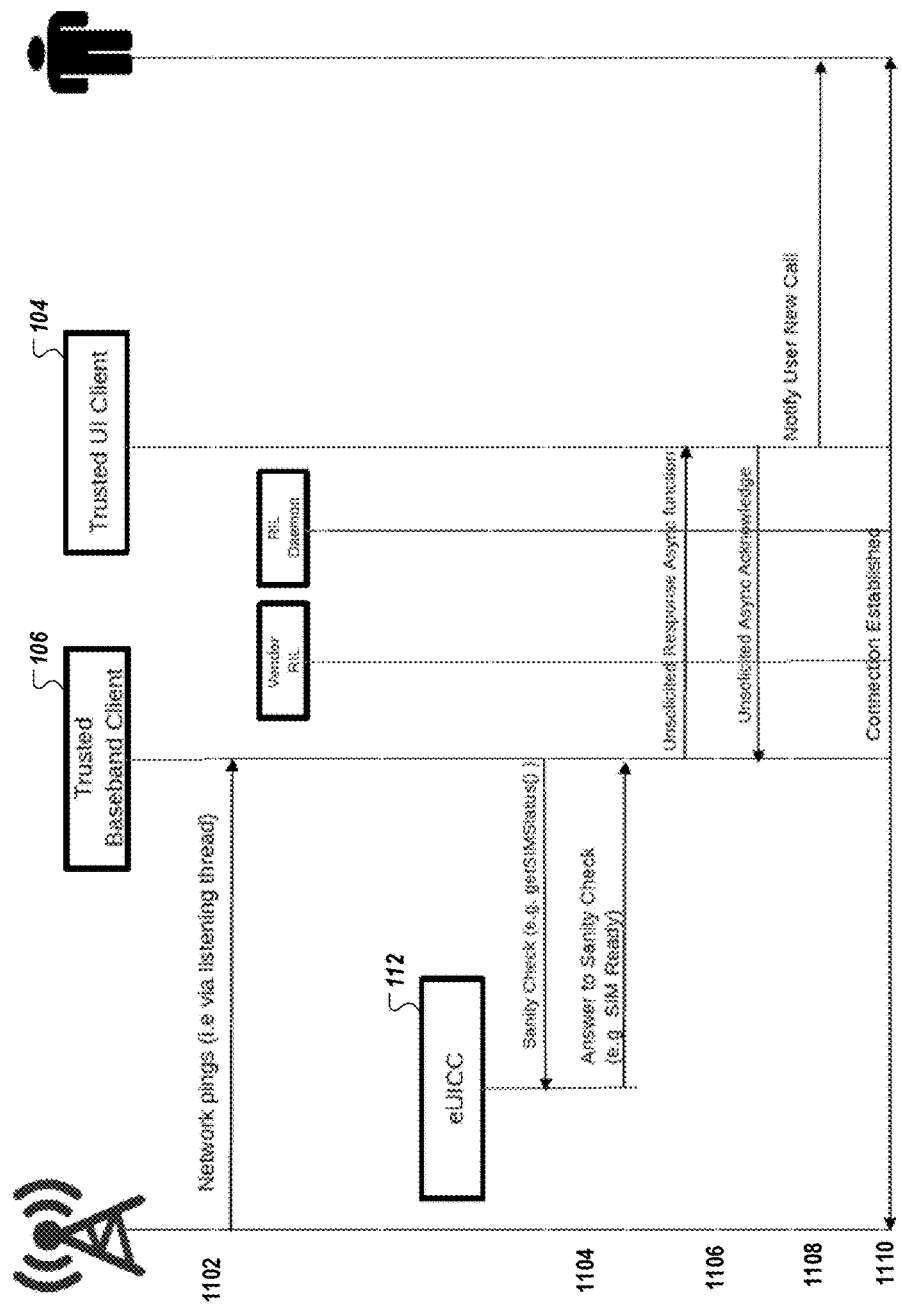
Figure 12:
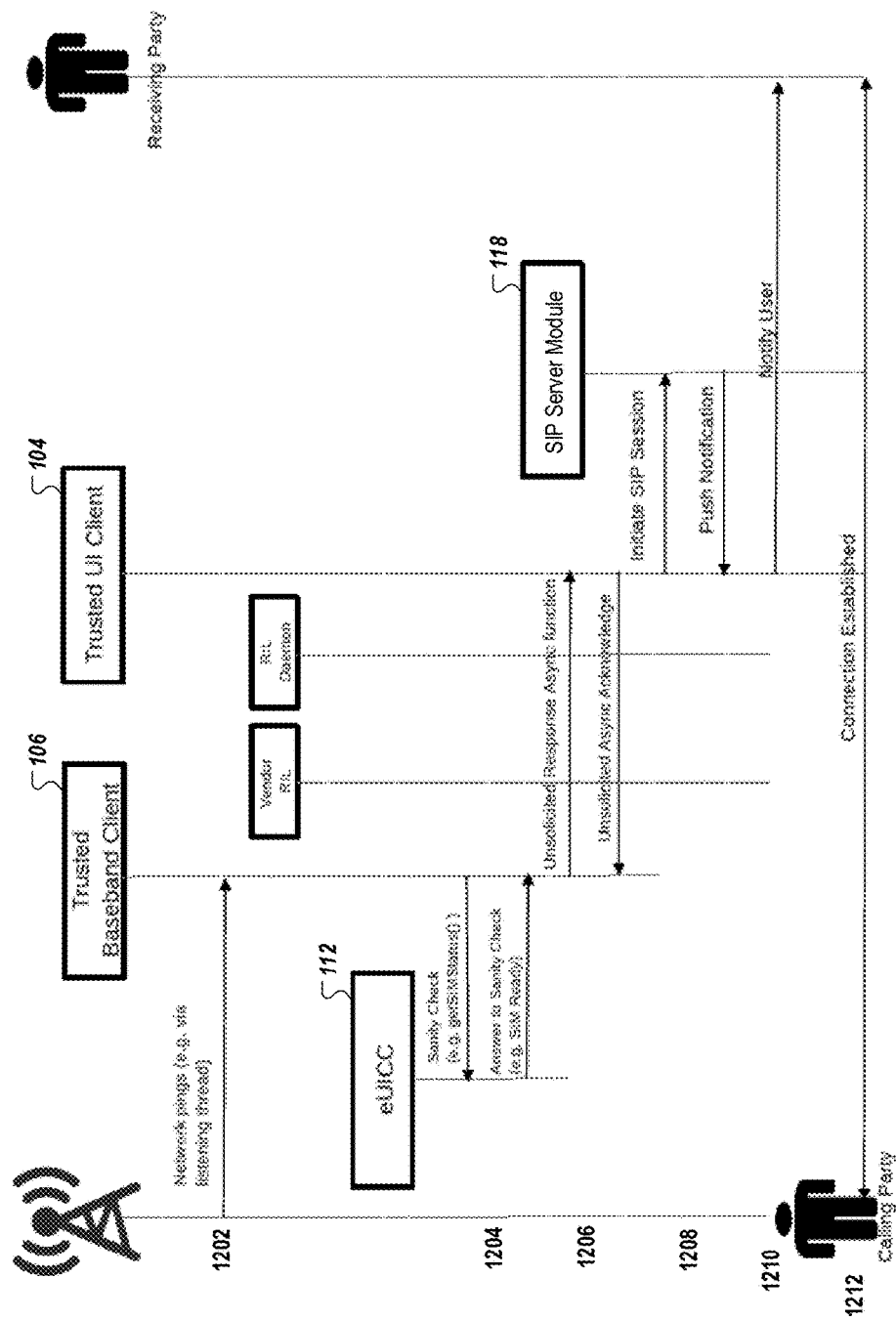

FIG. 4B illustrates a more complex profile manager architecture introducing the concept of sub-profiles that may also be utilized by example embodiments described herein;

FIG. 5 illustrates a Trusted User Interface (UI) client, in accordance with example embodiments described herein;

FIG. 6 illustrates the procedure for virtual SIM card routing, in accordance with example embodiments described herein;

FIG. 7 illustrates a procedure for installing a virtual SIM card, in accordance with example embodiments described herein;

FIG. 8 illustrates a procedure for activating and deactivating a virtual SIM card, in accordance with example embodiments described herein;

FIG. 9 illustrates the procedure for deleting a virtual SIM card, in accordance with example embodiments described herein;

FIG. 10 illustrates the procedure for initiating a call in multi-active mode, in accordance with example embodiments described herein;

FIG. 11 illustrates the procedure for receiving a call in multi-active mode, in accordance with example embodiments described herein; and FIG. 12 illustrates the procedure for call forwarding in VoIP mode, in accordance with example embodiments described herein;

DETAILED DESCRIPTION

Some embodiments will now be described more fully hereinafter with reference to the accompanying drawings, in which some, but not necessarily all contemplated embodiments are expressly illustrated. Indeed, the inventions contemplated herein may be embodied in many different forms and should not be construed as limited to the embodiments set forth herein; rather, these embodiments are provided so that this disclosure will satisfy applicable legal requirements. Like numbers refer to like elements throughout.

As defined herein, a "computer-readable storage medium," which refers to a non-transitory physical storage medium (e.g., volatile or non-volatile memory device), can be differentiated from a "computer-readable transmission medium," which refers to an electromagnetic signal.

It will be understood that each software operation described herein may be implemented by various means, such as hardware, firmware, processor, circuitry, and/or other devices associated with execution of software including one or more computer program instructions. For example, one or more of the procedures described herein may be embodied by computer program instructions. In this regard, the computer program instructions which embody the described procedures may be stored by a memory of an apparatus and executed by a processor of the apparatus. As will be appreciated, any such computer program instructions may be loaded onto a computer or other programmable apparatus (e.g., hardware) to produce a machine, such that the resulting computer or other programmable apparatus implements the particular functions specified. These computer program instructions may also be stored in a computer-readable memory (e.g., a computer-readable storage medium) that may direct a computer or other programmable apparatus to operate in a particular manner, such that the instructions stored in the computer-readable memory produce an article of manufacture, the execution of which implements the specified functions. The computer program instructions may also be loaded onto a computer or other programmable apparatus to cause a series of operations to be performed on the computer or other programmable apparatus to produce a computer-implemented process such that the computer program instructions executed on the computer or other programmable apparatus cause the performance of operations for implementing the specified functions.

Turning first to FIG. 1A, a high-level system overview of the end-to-end virtual SIM platform is illustrated. As shown in FIG. 1A, embodiments contemplated herein enable a single device to connected to connect to a plurality of different networks (e.g., Networks A through D) using a series of virtual SIM cards stored in an eUICC. In turn, a virtual SIM management platform, referred to herein as MNOHUB server 102, facilitates the provisioning (e.g., purchase, activation, deactivation, and deletion, or the like) of the virtual SIM cards. The virtual SIM management platform further communicates with a variety of MNOs or MVNOs associated with several of the networks available to the device and that offer the various virtual SIM cards for sale.

Turning now to FIG. 1B, a block diagram is provided that illustrates an example system 100 for implementing various aspects of the trusted subscription management platform. The system 100 is composed of a server-based software element referred to as MNOHUB server 102; an MS-based UI client application referred to as trusted UI client 104 and stored in an application memory of the MS; an MS-based real-time embedded program referred to as trusted baseband client 106 stored in a baseband memory of the MS and which may communicate with one or more cell towers 134 in one or more cellular networks (it should be understood that in some embodiments, that the application memory and the baseband memory may be apportionments of a single physical memory); a smart card-based client application referred to as on-card profile manager 108 hosted in each hardware-based eUICC instance; and, in addition or as an alternative to the on-card profile manager 108, an off-card client application referred to as off-card profile manager 110, hosted in each instance of a software-based eUICC. Both on-card profile manager 108 and off-card profile manager 110 may access and provision a set of MNO profiles 112, which may be stored locally by the MS or remotely (e.g., by the MHOHUB server 102, or by another remote device). Additionally, the trusted baseband client 106 may itself directly access the set of MNO profiles 112, although in some embodiments the trusted baseband client 106 may not be able to provision the set of MNO profiles 112.

The MNOHUB server 102 is comprised of various modules including a Subscription Manager (SM). The SM includes two modules, the Subscription Manager—Secure Routing (SM-SR) module 114, and the Subscription Manager—Data Preparation (SM-DP) module 116, and a Session Initiation Protocol (SIP) module 118.

The MNOHUB server 102 is designed as a robust, distributed, highly available and scalable software system with access to one or more secure databases 120, which are encrypted with secret cryptographic keys. The secure databases 120 include consumer profile tables, SIM card template tables, and transaction tables each configured with access controls. The secure databases 120 may exist in at least two replications, also referred to as master/slave modes. The MNOHUB server 102 also includes a transparent business logic module, referred to as Business Rules Module (BRM) 122, which provides a rules-based engine. All software modules in the MNOHUB server 102 application are connected to BRM 122, which is defined as a flexible, dynamically editable software module that stores rules governing operation of the software modules in the MNOHUB server 102 based on constraints imposed by various other devices within the system 100. In some embodiments, these rules may be created by the MNOHUB server 102 based on interactions with or instructions from the other devices within the system 100 (e.g., one or more mobile stations, MNOs 136, or the like) or may be received directly from those other devices.

In some embodiments, the software modules contained in the MNOHUB server 102 are implemented in an object-oriented programming language such as JAVA. The software binaries can be deployed on multiple server instances within a secure private network, protected by firewalls and/or using proxy-servers organized as a demilitarized zone (DMZ). Databases may be abstracted using Java Persistence API (JPA), thus hiding the complexity of managing multiple databases from the MNOHUB server 102. Hardware Security Modules (HSMs) 124 are also used by the MNOHUB server 102 as tamper-resistant hardware to store and manage cryptographic keys. Communication with HSMs 124 are generally performed via encrypted communication (e.g., using the PKCS#11 interface). The SM-SR 114 and SM-DP 116 may use individualized secure databases 120 and HSM 124 instances, further allowing the decoupling of the various component elements of the system.

The MS may include a touch screen display (element 302 in FIG. 3) and network access capabilities (e.g., modem 206 and radio frequency (RF) antenna 208, as illustrated in FIGS. 2 and 3). Upon purchase of the MS, the consumer is required to have identity verification performed before the device is activated due to KYC procedures enforced by the operator of the system 100. In some embodiments, the consumer may satisfy the KYC procedure by presenting his state or national ID card at the point of sale. In such embodiments, the merchant can then use a dashboard 126 (as shown in FIG. 1B) interfacing with the MNOHUB server 102 to activate both the account and the device. Account and device registration is required from the trusted UI client 104 (e.g., username, first name, last name, gender, date of birth, street address, city, country, citizenship, International Mobile Station Equipment Identity (IMEI), eUICC IDs, etc.).

The trusted UI client 104 can be installed into and accessible from the touch screen 302 in the MS. It can exchange data with the MNOHUB server 102 through HTTPS and/or secure socket connections. The trusted UI client 104 allows a consumer to view his virtual SIM cards, and/or download additional SIM cards and other items (e.g., prepaid plans, scratch cards, etc.) from a native SIM card store within the MNOHUB server 102 that is referred to as trusted virtual store 128. The MS implementing the trusted UI client 104 may natively integrate a graphical user interface (GUI) enabling interaction with the trusted virtual store 128. In this regard, the trusted UI client 104 is essentially the primary client application for a consumer to access the trusted virtual store 128.

The trusted virtual store 128 is a digital marketplace where virtual SIM cards are displayed for download or purchase based on the MNOs' campaign requirements. Campaign requirements may include images, profile data (International Mobile Subscriber Identities (IMSIs), static/dynamic network authentication key (Kis), binaries of applets, GSM file definition), unit price, discounts, eligibility, location, effective date, expiration date, and/or the like. Upon causing the trusted UI client 104 to display the items, the MNOHUB server 102 may further cause the trusted UI client 104 to dynamically append indicators for current local signal strengths. The dynamic appending method would generally rely on the multi-active mode of the MS hosting the trusted UI client 104, which would provide the signal strength for all nearby cell towers. The signal information is provided by the trusted baseband client 106 based on its low-level implementation of digital signal processing (i.e., GSM stack) and access to the modem 206 and the RF antenna 208 of the MS.

Upon the consumer's selection of an item for download, the trusted virtual store 128 determines if the item is free of charge (e.g. $0) or not. If the item is not free of charge, the trusted virtual store 128 uses the consumer's billing information (prepaid credits, credit card on file, etc.) to charge for the transaction via a payment processor 130 (shown in FIG. 1B). Upon success of the transaction, the remainder of the procedure is the same as the procedure for an item that is free of charge. In this regard, the trusted virtual store 128 allows the trusted UI client 104 to download the .sim file associated with the consumer's selection. The file is then unarchived locally in a directory including all the assets and metadata of said virtual SIM card. Network attributes are then parsed from the directory files and passed to the trusted baseband client 106. The trusted UI client 104 then triggers a proxy procedure by which the MNOHUB server 102 gathers profile data regarding the .sim file and sends personalization commands, via the trusted baseband client 106, to a profile manager (either on-card profile manager 108 or off-card profile manager 110, depending on the configuration of the MS hosting the trusted UI client 104) to install the profile data. Theses commands are coded as Application Protocol Data Units (APDUs). In some embodiments, this coding may be accomplished according to the message format defined in ISO 7816-4.

The trusted UI client 104 may be an Android application using a Secure Element Evaluation Kit (SEEK) Smartcard API that implements GSMA's Open Mobile API specifications. Alternatively, the trusted UI client 104 may be an iPhone, Firefox, Blackberry, Java ME, Windows Phone-based client or any client application provided it has the corresponding Application Programming Interfaces (APIs) used by its Android counterpart.

As part of the installation procedure, the trusted UI client 104 is granted access to the eUICC(s) and has access control rules set up so it could securely and confidentially communicate with a profile manager via the trusted baseband client 106. As previously described, the trusted UI client 104 provides a proxy functionality allowing communication between the MNOHUB server 102 and either on-card profile manager 108 or off-card profile manager 110 for provisioning virtual SIM cards (e.g., installing, deleting, or updating the virtual SIM cards). An example user interface presented by the trusted UI client 104 is described in greater detail below in association with FIG. 5.

Authentication prior to the consumer using the trusted UI client 104 is at least password-based. However, authentication may additionally or alternatively be implemented via a biometric scan, whereby, for instance, the consumer uses fingerprint to unlock the MS, which allows the trusted UI client 104 to be launched without requiring additional authentication. The reference biometric information against which the biometric scan is completed could be stored in a dedicated secure element in the MS.

The MNOHUB server 102 and each profile manager may use a mutual authentication procedure to create a secure communication channel (e.g., Secure Channel Protocol (SCP) 02 or SCP 03) before the profile manager can confidently execute a transaction. In the above example, the transaction is an installation. However, in all cases it is the responsibility of the trusted UI client 104 (after a consumer action) to initiate the transaction with the MNOHUB server 102 by specifying what type of transaction (INSTALL, DELETE, UPDATE, etc.) the consumer wants the MNOHUB server 102 to perform.

As shown in FIG. 2, a configuration of an example mobile station is provided. The configuration includes an on-card profile manager 108 is hosted on a hardware-based eUICC (hard-eUICC 202) and an off-card profile manager 110 is hosted on a software-based eUICC (soft-eUICC 204). An OEM is generally the issuer of an eUICC and thus manages the keys and provisions over-the-air (OTA) applications in the eUICC through the MNOHUB server 102. A hard-eUICC 202 may be connected directly to a modem 202 (or may be located apart from the MS and accessible by the MS via the modem 206 and RF antenna 208), while the soft-eUICC 204 may be connected to the MS via the trusted baseband client 106. In this regard, the trusted baseband client 106 may utilize one or more baseband virtual machines 210 running on top of a multi-core processor 216 to implement one or more corresponding soft-eUICCs 204. Trusted UI client 104, in turn, may itself include an application virtual machine 212, which includes an RIL module 214, and which may be connected to a device database 222 (e.g., local storage 132), which may store a set of MNO profile metadata 218 relating to the MNO profiles 112 stored on corresponding hard-eUICCs or soft-eUICCs. This locally-stored MNO profile metadata 218 may be accessible without requiring the use of a separate profile manager.

In some embodiments, the multi-core processor 216 (and/or co-processor or any other processing circuitry assisting or otherwise associated with the multi-core processor 216) may be in communication with a memory device (e.g., device database 222) via a bus for passing information among components of the mobile station. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like, for enabling the mobile station to carry out various functions in accordance with example embodiments described herein. For example, the memory device could be configured to buffer input data for processing by the multi-core processor 216. Additionally or alternatively, the memory device could be configured to store instructions for execution by the multi-core processor 216.

The mobile station may be embodied by a computing device, such as a computer terminal. However, in some embodiments, the mobile station may be embodied as a chip or chip set. In other words, the mobile station may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The mobile station may therefore, in some cases, be configured to implement example embodiments on a single chip or as a single "system on a chip." As such, in some cases, a chip or chipset may constitute means for performing one or more operations for providing the functionalities described herein.

The multi-core processor 216 may be embodied in a number of different ways. For example, the multi-core processor 216 may be embodied as one or more of various hardware processing means such as a co-processor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the multi-core processor 216 may include one or more processing cores configured to perform independently. The multi-core processor 216 may enable multiprocessing within a single physical package. Additionally or alternatively, the multi-core processor 216 may include one or more processors configured in tandem via the bus to enable independent execution of instructions, pipelining, and/or multithreading.

In an example embodiment, the multi-core processor 216 may be configured to execute instructions stored in the memory device or otherwise accessible to the multi-core processor 216. Alternatively or additionally, the multi-core processor 216 may be configured to execute hard-coded functionality. As such, whether configured by hardware or software methods, or by a combination thereof, the multi-core processor 216 may represent an entity (e.g., physically embodied in circuitry) capable of performing operations according to example embodiments while configured accordingly. Thus, for example, when the multi-core processor 216 is embodied as an ASIC, FPGA, or the like, the multi-core processor 216 may be specifically configured hardware for conducting the operations described herein. Alternatively, as another example, when the multi-core processor 216 is embodied as an executor of software instructions, the instructions may specifically configure the multi-core processor 216 to perform the algorithms and/or operations described herein when the instructions are executed. However, in some cases, the multi-core processor 216 may be a processor of a specific device (e.g., a pass-through display or a mobile terminal) configured to employ example embodiments o by further configuration of the multi-core processor 216 by instructions for performing the algorithms and/or operations described herein. The multi-core processor 216 may include, among other things, a clock, an arithmetic logic unit (ALU), and logic gates configured to support operation of the multi-core processor 216.

Meanwhile, RF antenna 208 may be any means such as a device or circuitry embodied in either hardware or a combination of hardware and software that is configured to receive and/or transmit data from/to a network and/or any other device or module in communication with the mobile station. In this regard, the RF antenna 208 may include, for example, one antenna or multiple antennas and supporting hardware and/or software for enabling communications with a wireless communication network.

The trusted UI client 104 may in turn be in communication with the multi-core processor 216 to provide output to the user and, in some embodiments, to receive an indication of a user input. As such, the trusted UI client 104 may include a display and, in some embodiments, may also include a keyboard, a mouse, a joystick, a touch screen, touch areas, soft keys, a microphone, a speaker, or other input/output mechanisms. Alternatively or additionally, the multi-core processor 216 may comprise user interface circuitry configured to control at least some functions of one or more user interface elements such as a display and, in some embodiments, a speaker, ringer, microphone, and/or the like. The multi-core processor 216 and/or user interface circuitry comprising the multi-core processor 216 may be configured to control one or more functions of one or more user interface elements through computer program instructions (e.g., software and/or firmware) stored on a memory accessible to the processor (e.g., memory device 14, and/or the like).

In some embodiments, the trusted UI client 104 is accessible only with Two-Factor Authentication (TFA). The TFA procedure requires the username, password, and a unique key retrieved from the MS. The unique private key is derived from a master key (MK) stored in a HSM 124 instance linked to the SM-SR 114.

Upon registration of the consumer with a given MS, the MNOHUB server 102 triggers the OTA installation of the profile manager and assigns randomly generated Profile Keys (PKs) to the instance of the applet. Alternatively, if the profile manager is pre-installed, the MNOHUB server 102 may elect to change the PKs. This key rotation mechanism is performed because the MNOHUB server 102 has access to the production keys used by the eUICC vendor. This assumes that the MS has secure access to the Internet. The MNOHUB server 102 reads the eUICCs' unique identifiers (EIDs) which are used as primary database keys to manage all the eUICCs in the system.

As previously described, newly used eUICCs would be trusted for the first time if the MNOHUB server 102 has prior knowledge of the eUICCs' serial numbers from the eUICC vendor after a personalization event (e.g., manufacturing of the MS). For obvious security reasons, these initial keys would be only known by trusted entities in the manufacturing and distribution chain. They are exchanged using pre-agreed Transport Keys (TKs) generally defined in a pre-personalization event (e.g., selection of the eUICC vendor). As noted previously, the MNHOHUB server 102 would rotate the PKs during a post-personalization event (e.g., purchase of the MS). The MNOHUB server 102 could also provide through its APIs a secure dashboard 126 to approved eUICC vendors (e.g., MNO 136, as illustrated in FIG. 1B). It should also be appreciated that these eUICC vendors could each independently operate a respective instance of the SM-DP 116. A default Bootstrap Roaming Profile (BRP) may be included in each eUICC.

Once each profile manager is post-personalized into the eUICC, the MNOHUB server 102 is the only entity with the capacity of exchanging data with them, as a mutual-authentication procedure is always required before provisioning (e.g., CREATE PROFILE, INSTALL PROFILE, DELETE PROFILE, etc.) can be performed. Such rules could be further enforced by an access control mechanism (e.g., PKCS#15) within the operating system of the MS to prevent an unauthorized application to "brute force" attack the profile manager or other resident applets managed within the eUICCs.

A profile manager is programmed to return non-confidential information when explicitly selected by an ISO-7816 SELECT command. The response to the SELECT command is referred to as the File Control Information (FCI). It may include information determining its version and available features in advance before any operation is performed with the MNOHUB server 102.

The MNO could utilize its existing enterprise application to communicate with the MNOHUB server 102. This may be performed through the integration of available secure web services APIs. In another embodiment, the MNO just relies on the MNOHUB server 102 as a software-as-a-service platform that may be accessed via secure dashboard applications (e.g., dashboard 126) without any required installation or backend integration. The MNO can create campaigns of virtual SIM cards, view the number of downloads of those virtual SIM cards in real-time, view other analytical data, and/or retrieve the account receivable information for the purchases, if any, and some usage data of the virtual SIM card that it normally has no access to in normal conditions.

With the appropriate terms and conditions and privacy rules, and having the consumer's consent to these agreements before usage of the MS, it may be possible to anonymously record location of origination, destination and duration of calls. The MNOHUB server 102 could then utilize the anonymous data to provide better analytics to the MNOs or even to provide sponsored incentives to the consumers. However, as the MNOHUB server 102 is not the issuer of the Ki for a given virtual SIM card, it is impossible for the MNOHUB server 102 to intercept any communications between the MS and the MNO over a cellular network. This is due to the fact that each local session key (i.e., Kc) is generated to encrypt voice and data exchanges. It will be appreciated that this design thus guarantees the integrity and confidentiality of any information exchanged. It is in fact highly undesirable for the operator of the system 100 to attempt to compromise the trust of users of the MS.

When no MNO profiles 112 are loaded and Wi-Fi is not available, the BRP of a given eUICC will only allow opening one specific URL which is the URL of the trusted virtual store 128. The roaming data fees may then be paid by the operator of the system 100 rather than by the consumer. Changes in the operating system of the MS shall be thus necessary to restrict Internet access. For instance, on an Android MS, such modification could be done in the Internet software stack which would then always request authorization from the trusted UI client 104 before opening an Internet connection.

The MNOHUB server 102 may allow porting of an existing phone number to the platform. When MNOs are integrated with the APIs associated with the MNOHUB server 102, directly or indirectly through a third party vendor, porting mobile numbers can be then automated (i.e., within a few minutes to seconds), otherwise the authorized operator of the platform have to manually contact the MNOs to provide such service. According to the United States' Federal Communication Commission (FCC), local number portability is a requirement as long as the consumer remains in the same geographic area. This requirement has been also enforced in many countries around the world. Therefore, subscribers remaining in the same geographic area can switch from one MNO to another MNO and still keep their existing phone numbers.

As noted previously, the MNOHUB server 102 may include a dashboard 126 that allows an MNO to securely create and manage campaigns of MNO profiles 112. For each profile, the MNO could upload images corresponding to a virtual SIM card, specify display labels, descriptions, prices, and sensitive information (such as applets, files, and keys, or the like). Upon a consumer's selection of the virtual SIM card for download, a .sim file is generated by the MNOHUB server 102 based on the campaign data for that specific MNO profile. The .sim file provides all the information needed by the trusted UI client 104 in the MS to display the virtual SIM card. A .sim file is described as a secure archive file (e.g. ZIP file) with all the assets of a virtual SIM card. Sensitive MNO profile data (e.g., applets, files, keys, or the like) may then be securely stored in the eUICC, as is indicated in FIG. 2 by elements 220. The .sim file may include signature files to validate their integrity. The .sim file may also include one or several metadata files 218 describing the virtual SIM card. A notification URL could be also embedded in a metadata file 218 to allow the MS to notify the MNO that the profile has been successfully downloaded. The notification could then be used trigger the activation of the virtual SIM card directly by the MNO through its OTA keys.

A multi-SIM, single-standby configuration is one of the possible operating mode for the MS. However, in some embodiments, it is contemplated that the MS would operate in default mode as a multi-SIM, multi-active mobile equipment.

Such multi-SIM, multi-active functionality could be implemented using hard-eUICCs 202 alone. In general, manufacturers may try to implement this functionality with multiple baseband processors, each connected to a single hard-eUICC. Alternatively, some manufacturers may use a single baseband processor connected to multiple hard-eUICCs 202. These configurations may drive up the cost of the MS substantially. Both configurations would generally quickly create overheating and drain batteries as the number of hard-eUICCs 202 increases. It is further noted that there would be a physical limitation as to how many baseband processors or hard-eUICCs 202 an OEM may integrate into the MS.

A software-only implementation is also contemplated in which a Trusted Execution Environment (TEE) provides a secure multi-virtual machine (MVM) for a Java Card operating system. In some embodiments, the TEE runs on top of a secure Linux kernel 304 which operates on top of an Embedded Hypervisor 306. Each running instance of the Java Virtual Machine (JVM) would then correspond to a virtual SIM card. A running instance JVM is separated from another JVM by a firewall. The application manager of the MVM can create, pause and stop instances of a virtual SIM card. The trusted baseband client 106 may still communicate with the MVM container (soft-eUICC 204) via the Hayes command set (AT commands), Remote Procedure Calls (RPC), Remote Method Invocation (RMI) or any other messaging protocols. The trusted baseband client 106 communicates through "soft-connectors" with the TEE, which, in turn, is hosted either on-apparatus (e.g., in the application processor) or in a remote location (e.g., on a distant server).

On a system-on-chip (S2oC) solution, such as that described below, the "soft-connector" may be simply described in advance in a property file accessible by the trusted baseband client 106 upon booting of the MS. Each message sent by the trusted baseband client 106 to the virtual SIM card in the local or remote TEE is then processed by its associated application manager or in general by the Java Card Runtime Environment (JCRE). In many cases, a multi-SIM, multi-active MS would require the trusted baseband client 106 to have pre-allocated in advance the number of "soft-connectors" it can support. This number would be then communicated to the Radio Interface Library (RIL) module (e.g., element 312 in FIG. 3) used by the trusted UI client 104. When a virtual SIM card is located in a remote server, the standard GSM authentication procedure is extended to allow the MS to access the cellular network. This embodiment is hereafter referred to as the eUICC-in-the-cloud method. This would generally require an update to an existing cellular network platform to manage session-based tokens, which implies an improvement to the standard authentication process in GSM networks. The modification includes an additional procedure to process a new type of response message from the MS during the authentication process.

The cellular network is described to comprise standard network components such as Base Transceiver Station (BTS), Base Station Controller (BSC), Mobile Switching Center (MSC), Home Location Register (HLR), Authentication Center (AuC), Visitor Location Register (VLR), Equipment Identity Register (EIR). These cellular network components communicate with the MS via the BTS through an air interface (e.g., the Um interface).

The trusted baseband client 106 in the MS requests over-the-air access to the cellular network by providing the IMSI retrieved from the currently activated virtual SIM card. In case there are multiple activated virtual SIM cards, the trusted baseband client 106 is informed by the trusted UI client 104 which virtual SIM card should be used. It is noted again that in many embodiments, communication with a cellular network is exclusively performed through the trusted baseband client 106.

Once the MSC receives the IMSI, it requests the AuC via the VLR (or HLR) to generate an authentication vector consisting of a random challenge number (RAND), an expected signed response (SRES) and a session key (Kc) for a classic GSM authentication. For UMTS or LTE authentication, a network authentication token (AUTN) is also provided. Additional parameters could be also returned. The MSC challenges the MS by sending a RAND and a Cipher Key Sequence Number (CKSN) in an Authentication Request message. The RAND (and the AUTN) is then received OTA by the trusted baseband client 106 and then forwarded to the designated virtual SIM card. By having knowledge of the type connection (2G, 3G, 4G, etc.), the trusted baseband client 106 sends the corresponding command to the virtual SIM card.

The virtual SIM card receives the RAND value (and the AUTN value for 3G or 4G) and uses its locally stored Ki to generate a signed response (SRES) and the Kc. For 2G authentication, the RUN_GSM_ALGORITHM command to the SIM applet as specified in GSM TS 11.11 is used. For 3G or 4G authentication, the AUTHENTICATE command to the USIM applet as specified in 3GPP TS 31.102 is used. The trusted baseband client 106 then receives the SRES response from the virtual SIM Card and then sends it to the MSC in an Authentication Response. If the SRES value is identical to the one given in the authentication vector, the authentication is deemed as successful and the MS can consequently access the network. It is noted that the Kc never leaves the virtual SIM card throughout this authentication procedure.

For the eUICC-in-the-cloud method, a Random Secure Authentication Token (RSAT) is generated in the MS by the trusted baseband client 106. The RSAT may be represented as an encrypted data object composed of an IMSI, an IMEI, an asymmetric key, and a SM-DP Uniform Resource Locator (URL). Upon receiving the RSAT, the cellular network then connects to the SM-DP 116, which stores the IMSI for the given virtual SIM card respectively in a database and which stores the Ki for the given virtual SIM card using an HSM instance. The SM-DP 116 may have a server-based TEE which would host the instant MNO profile of the MNO for the given subscriber. It will be appreciated that the SM-DP 116 may in some embodiments use a physical SIM card bank that consists of a plurality of concurrent reprogrammable physical SIM cards. The SM-DP 116 may then recycle unused virtual SIM cards during each GSM authentication transaction.

A standard GSM authentication protocol then occurs, which consists of an exchange between the AuC and SM-DP 116. Upon success, the cellular network subsequently allows voice and data communication for the given MS. The operator of the system 100 would have to guarantee quality of Service (QoS) in order to enable MNOs to rely on its solution for the eUICC-in-the-cloud method. Such QoS measures may include improved time, or at least identical performance time, for a cloud-based authentication transaction.

FIG. 3 illustrates the hybrid approach, which combines the previously described hardware and software implementation in its various embodiments, and which provides another embodiment for virtualizing physical SIM cards. The hybrid approach takes advantage of the close integration between the MNOHUB server 102, the MS, and the cellular network system.

In the following section, an implementation of this approach is described that uses the Android Open-Source Project (AOSP) stack. However, those skilled in the art will appreciate how the same concepts, once known, could be developed for other mobile operating systems. Using AOSP as a reference operating system for this implementation, it will further be understood that the trusted baseband client 106 may be implemented using an adaptation of an off-the-shelf GSM baseband software including a GSM protocol stack (layer 1, 2 and 3), drivers, etc. The trusted baseband client 106 may run on a real-time secure Linux 314 platform (e.g., using a security-enhanced (SE)-Linux kernel 304), which then sits on top of an Embedded Hypervisor (EH) 306. The Android Virtual Machine 308 may then run on the secure Linux kernel 304, which would be a guest operating system in one of the partitions, while the baseband code (e.g., the real-time application) runs in another partition, all in a parallel fashion. Concerns around radio performance, reliability, and certification requirements for using one single multi-core processor (MCP) 310 (which may comprise multi-core processor 216, as described above, or may comprise a similar multi-core processor) for both application and baseband functionality are mitigated by using a Real-time Linux operating system with SE-Linux to provide security enhancement. Android Runtime (ART), which replaced Dalvik's VM in Android L, is then ported to enhance overall performance, reduce MPP usage, thus providing an improvement to battery runtime. The trusted baseband client 106 could exist in multiple instances to better support multiple active profiles. The trusted baseband client 106 can be implemented as a multi-threaded application, using, for instance, the C language, and has access to a virtual SIM card identifier table (i.e., Registry Table) including all profile URIs and other metadata locations. This design allows for an efficient routing procedure, which is described below in association with FIG. 6.

Turning now to FIGS. 4A and 4B, example eUICC architectures are illustrated in accordance with example embodiments described herein. The profile manager is generally implemented using the JAVA CARD framework, and in this regard may embody a Java Card Virtual Machine. In some embodiments, a profile manager comprises an on-MS representative for the MNHOHUB server 102. The profile manager helps to locally install, delete, and update multiple MNO profiles 112. In this regard, an MNO profile 112 includes MNO and/or MVNO specific virtual SIM card data. As described herein, an MNO profile 112 comprises a virtual SIM card. The data in an MNO profile 112 may include Java Card applets (SIM, USIM, etc.), files (elementary files (EFs), dedicated files (DFs), etc.) and/or cryptographic keys related to the specific issuing MNO.

Turning first to FIG. 4A, an example profile manager is illustrated. This profile manager may comprise an Issuer Security Domain-Registry (ISD-R) 402 and may use a shareable interface to access one or more MNO profiles 112, which are also referred to herein as Issuer Security Domain-Profiles (ISD-Ps) 404. The ISD-R 402 and ISD-Ps 404 may have ISO 7816-5 compliant Application Identifiers (AIDs), which allow them to be directly and explicitly identified or selected by an outside entity (i.e., a hardware or software element outside of the JCRE). Additionally, these elements can have specific Toolkit Application Reference (TAR) values, enabling them to be individually identified or selected.

However, as shown in FIG. 4B, an MNO profile 112 may be more complex, and may include one or more sub-profiles, whereby a sub-profile is defined as another MNO profile 112 within the first MNO profile 112. As shown in FIG. 4B, the engineering of this sub-profile architecture extends the standard eUICC architecture in a novel manner, and thus include non-obvious improvements. As with the embodiment shown in FIG. 4A, in FIG. 4B the profile manager may comprise an ISD-R 402 and may use a shareable interface to access ISD-Ps 404. However, as further shown in FIG. 4B, the ISD-R 402 may also access sub-profile managers (ISD-RPs) 406. The ISD-R 402 distinguishes between an ISD-P 404 and an ISD-RP 406 by maintaining the separate attributes of these respective data structures. The ISD-RP 406 may be implemented as another instance of an ISD-R 402 with limited privileges, and it can only maintain its own hierarchy of sub-profiles. In this regard, the ISD-RP 406 may contain sub-profiles 408 denoted as ISD-SPs, which are themselves similar to ISD-Ps 404. As with the ISD-R 402 and ISD-Ps 404, the ISD-RPs 406 and the ISD-SPs 408 may also have ISO 7816-5 compliant AIDs and may further have specific TAR values, enabling them to be individually identified or selected.

This sub-profile organization allows for instance, a carrier aggregator operating as an MVNO to switch or swap MNO profiles 112 transparently for a consumer. In operation, the consumer may only see the MVNO in the user-interface. In other words, if an MVNO had agreements with MNO A, B and C and purchased wholesale minutes, it could elect to use the best MNO at a given time, depending on its customers' location, network performance or availability, pricing, etc. Thus, an MNO profile 112 with multiple sub-profiles that is currently activated by a consumer will silently pass-through network transactions to the sub-profile that is activated by the MVNO.

FIG. 5 illustrates an example interface 500 provided by the trusted UI client 104 to enable a user to utilize the trusted subscription management platform to provision various MNO profiles 112 (e.g., virtual SIM cards). Using this interface, the trusted UI client 104 may present a user of the MS with a series of MNO profiles 112 available for selection by the user. Each MNO profile 112 may include a corresponding virtual SIM card logo and name (together, element 502), and may include an associated signal strength indicator 504. A currently operating MNO profile 112 may be indicated by an activation status indicator 506. In an instance in which a user has installed an MNO profile 112 provided by a carrier-aggregating MVNO, the interface may display a single entry associated with the MVNO even though the MVNO may swap between underlying sub-profiles based on which sub-profile provides the best value/QoS at a given time. The illustrated interface provided by the trusted UI client 104 may also provide an icon 508 selectable to initiate the Enhanced Phone Application, another icon 510 to access the trusted virtual store 128, and yet another icon 512 to access profile information, billing information, or the sign out. In this fashion, the trusted UI client 104 is configured to provide a simple and user-friendly design that enables a consumer to utilize the benefits provided by the trusted subscription management platform.

Turning now to FIG. 6, an example routing procedure is described for retrieving information regarding a particular virtual SIM card. The operations described in FIG. 6 may, for instance, be performed by the MS, utilizing the multi-core processor 310, and/or the other elements described above in association with FIGS. 2 and 3.

In operation 602, the trusted baseband client 106 may gather the URIs of the virtual SIM cards stored in a local Registry Table accessible by the trusted baseband client 106. Using this Registry Table, the trusted baseband client 106 can keep track of some or all subscription related information, including user preference, currently enabled and disabled subscriptions, designated data subscription, and the like. As noted in FIG. 3, the hard-eUICC(s) 202 may be accessible by the modem 206, preferably with USB support for faster communication, while the soft-eUICC(s) 204 may be stored in the local TEE or remotely (e.g., in the MNOHUB server 102).

In operation 604, the trusted baseband client 106 may determine whether an identified virtual SIM card is located in a hard-eUICC 202 or in a soft-eUICC 204. For instance, the trusted baseband client 106 may perform a lookup operation in the Registry Table. In an instance in which an identified virtual SIM card is located in a hard-eUICC 202, the procedure advances to operation 606, in which the trusted baseband client 106 communicates with the virtual SIM card via AT commands. Alternatively, in an instance in which an identified virtual SIM card is located in a soft-eUICC 204, the procedure advances to operation 608, in which the trusted baseband client 106 may further determine, via the Registry Table or otherwise, whether the soft-eUICC is located on the MS device itself.

If the identified virtual SIM card is located on the MS device itself, the procedure advances to operation 610, in which the trusted baseband client 106 retrieves the virtual SIM card information from the local storage of the MS device. If the identified virtual SIM card is located remotely (e.g., using an eUICC-in-the-cloud methodology), the procedure advances to operation 612, in which the trusted baseband device 106 retrieves the virtual SIM card information from the remote server hosting the soft-eUICC (e.g., the MNOHUB server 102). From operations 606, 610, or 612, the gathered virtual SIM card information is retrieved for subsequent utilization. In this fashion, the trusted baseband client 106 may dynamically oscillate from the weakest to strongest signal strength (e.g., by changing cellular networks) seamlessly without user intervention.

Software and hardware modifications to the SoC are hereby described that allow the RIL module 312 to control a multimode baseband application (e.g., the trusted baseband client 106), all residing in a single multi-core processor hardware device. This closer integration allows support of a plurality of concurrent virtual SIM cards. The hard-eUICCs 202 may still be leveraged for legacy cellular network operators (e.g., traditional MNOs), while the soft-eUICCs 204 could be leveraged by other cellular networks (e.g., MVNOs). Accordingly, in situations where a hard-eUICC 202 is no longer required, the MS may thus comprise a fully "sim-less" mobile device.

Android Telephony API is a wrapper around the Android Telephony Service (i.e., rild daemon). The rild daemon is then integrated with a vendor specific RIL. As described herein, the vendor specific RIL is based on an adaptation of a baseband software comprising the trusted baseband client 106. The trusted UI client 104 is integrated within the standard Phone application using the Android Telephony API.

As previously noted, the application and the baseband processors may be combined into one single MCP to provide a cost-effective SoC solution. An EH which supports multiple OS virtual machines may be integrated into the MS from the outset to improve real-time performance. It should be appreciated that while the modem 206 is described herein as a separate hardware element connected to the application processor on the PCBA, the modem 206 could be located on-die. Such integration, which is becoming common in the mobile industry, has various advantages for the OEM during the assembly process. The OEM may for instance focus more on adding additional chip components (e.g., sensors) to differentiate its products.

Turning now to FIG. 7, an example procedure is illustrated for installation of a virtual SIM card. In operation 702, the MS includes means, such as a processor (e.g., multi-core processor 310), for launching the trusted UI client 104. Subsequently, the trusted UI client 104 may natively integrate a GUI enabling consumer interaction with the trusted virtual store 128. For instance, as shown in operation 704, the consumer may browse through a list of virtual SIM cards and select one or many for installation. For each selected virtual SIM card, operations 706 through 714 illustrate a sequence of operations completing installation of the selected virtual SIM card. In this regard, after processing payment (if necessary), in operation 706 the trusted virtual store 128 subsequently authorizes transmission of the .sim file associated with each consumer selection to the trusted UI client 104, and the file is then unarchived locally by the MS into a directory including all the assets and metadata of the selected virtual SIM card and network attributes are parsed from the directory files and passed to the trusted baseband client 106.

In operation 708, the trusted UI client 104 then triggers a proxy procedure by which the MNOHUB server 102 gathers profile data regarding the .sim file (e.g., via Sm-SR 114 and SM-DP 116), and in operation 710, the trusted UI client 104 sends personalization commands, via trusted baseband client 106, to a profile manager (either on-card profile manager 108 or off-card profile manager 110, depending on the configuration of the MS to install the profile data. Subsequently, in operation 712, notification of installation is transmitted from the trusted UI client 104 to the MNOHUB server 102 (e.g., via SM-SR 114 and SM-DP 116) and in operation 714, a notification may be provided to the user that the installation of the selected virtual SIM card has been completed.

Turning next to FIG. 8, an example procedure is illustrated for activation and deactivation of a virtual SIM card. In operation 802, the MS includes means, such as a processor (e.g., multi-core processor 310), for launching the trusted UI client 104. Subsequently, in operation 804, the trusted UI client 104 may display an interface enabling the user to browse through a list of virtual SIM cards and select one or many for activation or deactivation. For each selected virtual SIM card, operations 806 through 812 illustrate a sequence for activation or deactivation of the selected virtual SIM card. In operation 806, the trusted UI client 104 then triggers a proxy procedure by which the MNOHUB server 102 (and in particular, SM-SR 114) communicates with the profile manager associated with the selected virtual SIM card to facilitate the activation or deactivation process. In operation 808, the trusted UI client 104 may transmit activation or deactivation commands associated with the selected virtual SIM card to the trusted baseband client 106 and, in turn, the profile manager associated with the selected virtual SIM card. Finally, in operation 810, notification of activation or deactivation is transmitted from the trusted UI client 104 to the MNOHUB server 102 (e.g., via SM-SR 114) and in operation 812, a notification may be provided to the user that the activation or deactivation has been completed.

In FIG. 9, an example procedure is illustrated for deletion of a virtual SIM card. In operation 902, the MS includes means, such as a processor (e.g., multi-core processor 310), for launching the trusted UI client 104. Subsequently, in operation 904, the trusted UI client 104 may display an interface enabling the user to browse through a list of virtual SIM cards and select one or many for deletion. For each selected virtual SIM card, operations 906 through 904 illustrate a sequence of operations that facilitate the deletion of the selected virtual SIM card. In operation 906, the trusted UI client 104 causes deletion of the .sim file stored locally on the MS. In operation 908, the trusted UI client 104 triggers a proxy procedure by which the MNOHUB server 102 (and in particular, SM-SR 114) communicates with the profile manager associated with the selected virtual SIM card to facilitate the deletion process. In operation 910, the trusted UI client 104 transmits a deletion command regarding the selected virtual SIM card to the trusted baseband client 106 and, in turn, the profile manager associated with the selected virtual SIM card. Finally, in operation 912, notification of deletion is transmitted from the trusted UI client 104 to the MNOHUB server 102 (e.g., via SM-SR 114) and in operation 914, a notification may be provided to the user that the deletion has been completed.

From the trusted UI client 104, call initiation in multi-active mode is described in association with FIG. 10. In operation 1002, the consumer launches the trusted UI client 104, and subsequently in operation 1004, the consumer initiates a call with a particular virtual SIM card via a Dialer application. In operation 1006, the trusted UI client 104 may invoke the rild daemon described above to solicit an Async function (e.g., DIAL( )), and in response the trusted baseband client 106 acknowledges receipt of the request. In operation 1008, the trusted baseband client transmits a sanity check (e.g., an API get SIMStatus( )) call) to the eUICC via a profile manager (or in some embodiments, directly), in response to which the eUICC response with an answer (e.g., "SIM Ready"). Subsequently, in operation 1010, the trusted baseband client 106 connects to the relevant SIM card provider (e.g., MNO) via a cell tower or other access point by utilizing a modem TCP/IP stack, in response to which a connection is established. Finally, in operation 1012, the trusted baseband client 106 transmits a "dial complete" message to the trusted UI client 104, and in operation 1014, the trusted UI client 104 updates the interface presented to the consumer to indicate establishment of the connection.

In turn, call reception in multi-active mode is described in association with FIG. 11. In operation 1102, the trusted baseband client 106 receives a network ping from a cell tower or other access point via a listening thread associated with a virtual SIM card. In operation 1104, the trusted baseband client transmits a sanity check (e.g., an API get SIMStatus( )) call) to the eUICC via a profile manager (or in some embodiments, directly), in response to which the eUICC response with an answer (e.g., "SIM Ready"). Subsequently, in operation 1106, the trusted baseband client 106 transmits an unsolicited response Async function via a vendor RIL and the rild daemon associated with the trusted UI client 104, in response to which the trusted UI client 104 acknowledges receipt of the unsolicited transmission. Finally, in operation 1108, the trusted UI client 104 updates the interface presented to the consumer to notify the user of a new incoming call, and in response to user input, operation 1110, the trusted UI client 104 and trusted baseband client 106 communicate establishment of the connection to the user and via the cell tower or other access point.

In some embodiments, the trusted UI client 104 may be seamlessly integrated with VoIP service to fully replace a standard Phone application. This modification is referred to as an Enhanced Phone Application and essentially leverages an integrated SIP client module (e.g., SIP module 118). Such seamless integration allows a single UI to have access to virtual SIM cards, contacts, messages, recent calls, voicemail, and dialer functionality. The VoIP functionality could, for instance, provide Wi-Fi calling in locations where cellular coverage is minimal or for situations where the consumer prefers to use a local Wi-Fi access point.

Turning now to FIG. 12, an example procedure for call forwarding in VoIP mode is illustrated. In operation 1202, the trusted baseband client 106 receives a network ping from a cell tower or other access point via a listening thread associated with a virtual SIM card. In operation 1204, the trusted baseband client transmits a sanity check (e.g., an API get SIMStatus( )) call) to the eUICC via a profile manager (or in some embodiments, directly), in response to which the eUICC response with an answer (e.g., "SIM Ready"). Subsequently, in operation 1206, the trusted baseband client 106 transmits an unsolicited response Async function via a vendor RIL and the rild daemon associated with the trusted UI client 104, in response to which the trusted UI client 104 acknowledges receipt of the unsolicited transmission. Subsequently, in operation 1208, the trusted UI client 104 initiates a SIP session via transmission to the SIP module 118 of MNOHUB 102, in response to which the trusted UI client 104 receives a push notification from the SIP module 118 regarding initiation of the SIP session. In operation 1210, the trusted UI client 104 updates the interface presented to the consumer to notify the user of the new SIP session, and in response to user input, operation 1212, the trusted UI client 104 and trusted baseband client 106 communicate establishment of the SIP session to the user and the calling party.

When no virtual SIM card is activated and a Wi-Fi network is available, the Enhanced Phone Application can then use a default roaming profile to receive incoming calls on a roaming Virtual SIM card. In such embodiments, an incoming call is forwarded to the SIP module 118, which then figures out if the Calling Party is registered in the platform. If so, then the SIP module 118 pings the Calling Party's Enhanced Phone Application, and a SIP session is then transparently created.

To implement this Enhanced Phone Application embodiment when no virtual SIM card is activated, a default roaming Virtual SIM card may be managed by the MNOHUB server 102 as part of its VoIP service. Use of this embodiment also assumes that the Receiving Party has access to a Wi-Fi network. If a Wi-Fi network is not available, the MNOHUB server 102 could then send a short notification using the transparent roaming profile to indicate to the Receiving Party that the Calling Party is trying to join him. Alternatively, a voice message could be left in a remote voice message box. In this fashion, the platform maybe ultimately operated in such embodiments as an all IP mobile network.

As described herein, example embodiments include apparatuses, systems and a set of methods for virtualizing physical SIM cards using a plurality of concurrent eUICCs (embodied in software and/or hardware). However, that many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising a server device and a mobile device, wherein the server device includes at least one processor and at least one memory storing computer-executable instructions that, when executed by the at least one processor, cause the server device to:
 transmit, to a trusted user interface (UI) client of a mobile station, information regarding a set of virtual subscriber identity module (SIM) cards associated with the mobile station;
 receive, from the trusted UI client of the mobile station, a request to provision a particular virtual SIM card;
 initiate, by a subscription manager—secure routing (SM-SR) module of the server device and via a trusted baseband client stored in a baseband memory of the mobile device, a secure proxy channel between the server device and a profile manager that hosts the particular virtual SIM card; and
 transmit, via the secure proxy channel and to the profile manager, an instruction regarding the particular virtual SIM card, wherein transmitting the instruction via the secure proxy channel includes routing the instruction through the trusted baseband client.

2. The system of claim 1, wherein the computer-executable instructions, when executed by the at least one processor, further cause the server device to:
 transmit, to the trusted UI client of the mobile station, information regarding a set of virtual SIM cards offered by a trusted virtual store associated with the server device,
 wherein the request to provision the particular virtual SIM card comprises a request to purchase a virtual SIM card selected from the set of virtual SIM cards offered by the trusted virtual store.

3. The system of claim 1, wherein the computer-executable instructions, when executed by the at least one processor, further cause the server device to:
 create the secure proxy channel between the server device and the profile manager using a mutual authentication procedure.

4. The system of claim 1, wherein the computer-executable instructions, when executed by the at least one processor, further cause the server device to register the mobile station.

5. The system of claim 4, wherein the computer-executable instructions, when executed by the at least one processor, further cause the server device to register the mobile station by causing the server device to assign the mobile station a unique random cryptographic key.

6. The system of claim 4, wherein registration of the mobile station establishes that no additional registrations are required for newly purchased virtual SIM cards.

7. The system of claim 1, wherein the request to provision the particular virtual SIM card of the set of virtual SIM cards comprises a request to:
 purchase a virtual SIM card;
 activate a virtual SIM card;
 deactivate a virtual SIM card; or
 delete a virtual SIM card.

8. The system of claim 7, wherein the request to provision the particular virtual SIM card of the set of virtual SIM cards is received from the trusted UI client of the mobile station via an internet protocol (IP) channel.

9. A method comprising:
 transmitting, by a server device and to a trusted user interface (UI) client of a mobile station, information regarding a set of virtual subscriber identity module (SIM) cards associated with the mobile station;
 receiving, from the trusted UI client of the mobile station, a request to provision a particular virtual SIM card;
 initiating, by a subscription manager-secure routing (SM-SR) module of the server device and via a trusted baseband client stored in a baseband memory of the mobile device, a secure proxy channel between the server device and a profile manager that hosts the particular virtual SIM card; and
 transmitting, via the secure proxy channel and to the profile manager, an instruction regarding the particular virtual SIM card, wherein transmitting the instruction via the secure proxy channel includes routing the instruction through the trusted baseband client.

10. The method of claim 9, further comprising:
 transmitting, to the trusted UI client of the mobile station, information regarding a set of virtual SIM cards offered by a trusted virtual store associated with the server device,
 wherein the request to provision the particular virtual SIM card comprises a request to purchase a virtual SIM card selected from the set of virtual SIM cards offered by the trusted virtual store.

11. The method of claim 9, further comprising:
 creating the secure proxy channel between the server device and the profile manager using a mutual authentication procedure.

12. The method of claim 9, further comprising:
 registering the mobile station.

13. The method of claim 12, wherein registering the mobile station includes:
 causing the server device to assign the mobile station a unique random cryptographic key.

14. The method of claim 12, wherein registration of the mobile station establishes that no additional registrations are required for newly purchased virtual SIM cards.

15. The method of claim 9, wherein the request to provision the particular virtual SIM card of the set of virtual SIM cards comprises a request to:
 purchase a virtual SIM card;
 activate a virtual SIM card;
 deactivate a virtual SIM card; or
 delete a virtual SIM card.

16. The method of claim 15, wherein the request to provision the particular virtual SIM card of the set of virtual SIM cards is received from the trusted UI client of the mobile station via an internet protocol (IP) channel.

17. A system comprising a server device and a mobile device,
wherein the server device includes:
means for transmitting, to a trusted user interface (UI) client of a mobile station, information regarding a set of virtual subscriber identity module (SIM) cards associated with the mobile station;
means for receiving, from the trusted UI client of the mobile station, a request to provision a particular virtual SIM card;
means for initiating, via a trusted baseband client stored in a baseband memory of the mobile device, a secure proxy channel between the server device and a profile manager that hosts the particular virtual SIM card; and
means for transmitting, via the secure proxy channel and to the profile manager, an instruction regarding the particular virtual SIM card; and
wherein the mobile device includes means for routing the instruction through the trusted baseband client.

18. The system of claim 17, further comprising:
means for transmitting, to the trusted UI client of the mobile station, information regarding a set of virtual SIM cards offered by a trusted virtual store associated with the server device;
wherein the request to provision the particular virtual SIM card comprises a request to purchase a virtual SIM card selected from the set of virtual SIM cards offered by the trusted virtual store.

19. The system of claim 17, wherein the request to provision the particular virtual SIM card of the set of virtual SIM cards comprises a request to:
purchase a virtual SIM card;
activate a virtual SIM card;
deactivate a virtual SIM card; or
delete a virtual SIM card.

20. The system of claim 19, wherein the server device further comprises means for receiving the request to provision the particular virtual SIM card of the set of virtual SIM cards from the trusted UI client of the mobile station via an internet protocol (IP) channel.

\* \* \* \* \*